(12) United States Patent
Zhang et al.

(10) Patent No.: US 12,739,679 B2
(45) Date of Patent: Sep. 15, 2026

(54) TECHNIQUES FOR REPORTING SEPARATE CROSS-LINK INTERFERENCE METRICS

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Muhammad Sayed Khairy Abdelghaffar, San Jose, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/315,843

(22) Filed: May 11, 2023

(65) Prior Publication Data

US 2024/0381147 A1 Nov. 14, 2024

(51) Int. Cl.
*H04W 24/10* (2009.01)
*H04B 17/345* (2015.01)

(52) U.S. Cl.
CPC .......... *H04W 24/10* (2013.01); *H04B 17/345* (2015.01)

(58) Field of Classification Search
None
See application file for complete search history.

(56) References Cited

U.S. PATENT DOCUMENTS

2022/0116129 A1* 4/2022 Ying .................... H04B 17/345
2023/0189315 A1* 6/2023 Haustein ............... H04W 24/02 370/252
2025/0226898 A1* 7/2025 Xiong ................... H04L 27/261
2025/0226899 A1* 7/2025 Xiong ................... H04L 5/0073
2025/0344086 A1* 11/2025 Shim .................... H04J 11/0026

FOREIGN PATENT DOCUMENTS

EP 3567759 A1 * 11/2019 ............ H04W 72/23
WO WO-2022021362 2/2022

OTHER PUBLICATIONS

International Search Report and Written Opinion—PCT/US2024/026621—ISA/EPO—Aug. 22, 2024 (2304709WO).

(Continued)

*Primary Examiner* — Walter J Divito
(74) *Attorney, Agent, or Firm* — Holland & Hart LLP

(57) ABSTRACT

Methods, systems, and devices for wireless communications are described. A user equipment (UE) may receive control signaling that indicates a set of cross-link interference (CLI) resources to monitor for inter-UE CLI and a set of separate inter-UE CLI metrics for the UE to report for the set of CLI resources. The control signaling may include at least a channel state information (CSI) resource configuration, or a CSI report configuration, or a CLI resource configuration, or a CLI report configuration, or a CSI aperiodic trigger state configuration, or a CLI aperiodic trigger state configuration, or a combination thereof. The UE may monitor the set of CLI resources to determine the set of separate inter-UE CLI metrics for the set of CLI resources. The UE may transmit a measurement report that indicates the set of separate inter-UE CLI metrics for the set of CLI resources.

26 Claims, 12 Drawing Sheets

(56) References Cited

OTHER PUBLICATIONS

Nokia, et al., "UE CLI Measurement Configuration and Reporting", 3GPP TSG-RAN2#106, R2-1906637_UE_CLI_REPORTING_V4, 3rd Generation Partnership Project, Mobile Competence Centre, 650, Route Des Lucioles, F-06921 Sophia-Antipolis Cedex, France, vol. RAN WG2, No. Reno, USA, May 13, 2019-May 17, 2019, May 13, 2019, XP051730097, 5 Pages, p. 3.

Qualcomm Incorporated: "On Potential Enhancements on Dynamic/flexible TDD", 3GPP TSG RAN WG1, Meeting #112, R1-2301412, 3rd Generation Partnership Project, Mobile Competence Centre, 650, Route Des Lucioles, F-06921 Sophia-Antipolis Cedex, France, vol. 3GPP RAN 1, No. Athens, Greece, Feb. 22, 2023-Mar. 3, 2023, Feb. 17, 2023, 37 Pages, XP052248544, pp. 10-12.

* cited by examiner

200

700

900

TECHNIQUES FOR REPORTING SEPARATE CROSS-LINK INTERFERENCE METRICS

FIELD OF TECHNOLOGY

The present disclosure relates to wireless communications, including techniques for reporting separate cross-link interference (CLI) metrics.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more network nodes, each supporting wireless communication for communication devices, such as a user equipment (UE). In some wireless communications systems, transmissions from one communication device may cause cross-link interference (CLI) at another communication device.

SUMMARY

The described techniques relate to improved methods, systems, devices, and apparatuses that support techniques for reporting separate cross-link interference (CLI) metrics. In accordance with one or more aspects of the present disclosure, a user equipment (UE) may receive control signaling that indicates a set of CLI resources to monitor for inter-UE CLI and a set of separate (i.e., dedicated, independent) inter-UE CLI metrics for the UE to report for the set of CLI resources. The UE may monitor, in accordance with the control signaling, the set of CLI resources to determine the set of separate inter-UE CLI metrics for the set of CLI resources. The UE may transmit, in accordance with the control signaling, a report that indicates the set of separate inter-UE CLI metrics for the set of CLI resources.

A method for wireless communications at a UE is described. The method may include: receiving control signaling that indicates a set of resources to monitor for inter-UE CLI and a set of separate inter-UE CLI metrics for the UE to report for the set of resources; monitoring, in accordance with the control signaling, the set of resources to determine the set of separate inter-UE CLI metrics for the set of resources; and transmitting, in accordance with the control signaling, a report that indicates the set of separate inter-UE CLI metrics for the set of resources.

An apparatus for wireless communications at a UE is described. The apparatus may include at least one memory and at least one processor coupled to the at least one memory, the at least one processor configured to: receive control signaling that indicates a set of resources to monitor for inter-UE CLI and a set of separate inter-UE CLI metrics for the UE to report for the set of resources; monitor, in accordance with the control signaling, the set of resources to determine the set of separate inter-UE CLI metrics for the set of resources; and transmit, in accordance with the control signaling, a report that indicates the set of separate inter-UE CLI metrics for the set of resources.

Another apparatus for wireless communications at a UE is described. The apparatus may include: means for receiving control signaling that indicates a set of resources to monitor for inter-UE CLI and a set of separate inter-UE CLI metrics for the UE to report for the set of resources; means for monitoring, in accordance with the control signaling, the set of resources to determine the set of separate inter-UE CLI metrics for the set of resources; and means for transmitting, in accordance with the control signaling, a report that indicates the set of separate inter-UE CLI metrics for the set of resources.

A non-transitory computer-readable medium storing code for wireless communications at a UE is described. The code may include instructions executable by a processor to: receive control signaling that indicates a set of resources to monitor for inter-UE CLI and a set of separate inter-UE CLI metrics for the UE to report for the set of resources; monitor, in accordance with the control signaling, the set of resources to determine the set of separate inter-UE CLI metrics for the set of resources; and transmit, in accordance with the control signaling, a report that indicates the set of separate inter-UE CLI metrics for the set of resources.

In some examples of the methods, apparatuses, and non-transitory computer-readable media described herein, receiving the control signaling may include operations, features, means, or instructions for receiving, via the control signaling, an indication of a channel state information (CSI) report configuration identifying the set of separate inter-UE CLI metrics for the UE to report, the set of separate inter-UE CLI metrics including at least a CLI reference signal received power (RSRP), or a CLI received signal strength indicator (RSSI), or a CLI signal to interference and noise ratio (SINR), or a combination thereof.

In some examples of the methods, apparatuses, and non-transitory computer-readable media described herein, receiving the control signaling may include operations, features, means, or instructions for receiving, via the control signaling, an indication of a CSI resource configuration identifying the set of resources to monitor for inter-UE CLI, the set of resources including one of a sounding reference signal (SRS) resource or resource set or an RSSI resource or resource set.

In some examples of the methods, apparatuses, and non-transitory computer-readable media described herein, receiving the control signaling may include operations, features, means, or instructions for receiving, via the control signaling, an indication of a CLI resource configuration identifying the set of resources to monitor for inter-UE CLI, the set of resources including an SRS resource set, an RSSI resources set, or both.

In some examples of the methods, apparatuses, and non-transitory computer-readable media described herein, receiving the control signaling may include operations, features, means, or instructions for receiving, via the control signaling, an indication of a CSI resource configuration identifying a CSI interference measurement resource (IMR) set list that includes at least a subset of the set of resources to monitor for inter-UE CLI, the subset including one or more dedicated channel measurement resources (CMRs) or IMRs.

In some examples of the methods, apparatuses, and non-transitory computer-readable media described herein, the set of resources include a CSI-IM resource that are used for CLI-RSSI measurement.

In some examples of the methods, apparatuses, and non-transitory computer-readable media described herein, receiving the control signaling may include operations, features, means, or instructions for receiving, via the control signaling, an indication of a CSI resource configuration identifying a CSI reference signal resource set list and a CLI resource set list that indicate the set of resources to monitor for channel and CLI, the set of resources including at least a non-zero-power CSI reference signal (NZP CSI-RS) resource set, or an SRS resource set, or an RSSI resource set, or a combination thereof.

In some examples of the methods, apparatuses, and non-transitory computer-readable media described herein, receiving the control signaling may include operations, features, means, or instructions for receiving, via the control signaling, an indication of a CSI resource configuration identifying the set of separate inter-UE CLI metrics, a CLI resource set, an NZP CSI-RS resource set, and a linkage between at least one CMR of the NZP CSI-RS resource set and one or more IMRs of the CLI resource set, where the set of separate inter-UE CLI metrics include at least a CLI-SINR.

In some examples of the methods, apparatuses, and non-transitory computer-readable media described herein, receiving the control signaling may include operations, features, means, or instructions for receiving, via the control signaling, an indication of a CSI report configuration identifying the set of resources to monitor for inter-UE CLI, the set of resources including at least one dedicated CLI measurement resource associated with a CSI resource configuration of the UE.

In some examples of the methods, apparatuses, and non-transitory computer-readable media described herein, receiving the control signaling may include operations, features, means, or instructions for receiving, via the control signaling, an indication of a CSI report configuration identifying the set of resources to monitor for inter-UE CLI, the set of resources including an SRS resource set, an RSSI resource set, or both.

In some examples of the methods, apparatuses, and non-transitory computer-readable media described herein, receiving the control signaling may include operations, features, means, or instructions for receiving, via the control signaling, an indication of a CLI report configuration identifying the set of resources to monitor for inter-UE CLI, the set of resources including an SRS resource set, an RSSI resource set, or both.

In some examples of the methods, apparatuses, and non-transitory computer-readable media described herein, receiving the control signaling may include operations, features, means, or instructions for receiving, via the control signaling, an indication of a CSI report configuration including a report quantity field that indicates the set of separate inter-UE CLI metrics including at least one of a CLI-RSRP, a CLI-RSSI, or a CLI-SINR.

In some examples of the methods, apparatuses, and non-transitory computer-readable media described herein, receiving the control signaling may include operations, features, means, or instructions for receiving, via the control signaling, an indication of an aperiodic CSI report trigger state configuration identifying the set of resources to monitor for inter-UE CLI, the set of resources including an SRS resources set, an RSSI resource set, or both.

In some examples of the methods, apparatuses, and non-transitory computer-readable media described herein, the aperiodic CSI report trigger state configuration further indicates QCL type-D information to use for CLI reference signal reception and receive beam measurement at the UE.

In some examples of the methods, apparatuses, and non-transitory computer-readable media described herein, receiving the control signaling may include operations, features, means, or instructions for receiving, via the control signaling, an indication of an aperiodic CLI report trigger state configuration identifying the set of resources to monitor for inter-UE CLI, the set of resources including an SRS resources set, an RSSI resource set, or both.

In some examples of the methods, apparatuses, and non-transitory computer-readable media described herein, the aperiodic CLI report trigger state configuration further indicates QCL type-D information to use for CLI reference signal reception and receive beam measurement at the UE.

A method for wireless communications at a UE is described. The method may include: transmitting or receiving control signaling that indicates a set of resources to monitor for inter-UE CLI and a set of separate inter-UE CLI metrics to report for the set of resources; transmitting, in accordance with the control signaling, one or more reference signals via the set of resources; and receiving, in accordance with the control signaling, a report that indicates the set of separate inter-UE CLI metrics for the set of resources.

An apparatus for wireless communications at a UE is described. The apparatus may include at least one memory and at least one processor coupled to the at least one memory, the at least one processor configured to: transmit or receive control signaling that indicates a set of resources to monitor for inter-UE CLI and a set of separate inter-UE CLI metrics to report for the set of resources; transmit, in accordance with the control signaling, one or more reference signals via the set of resources; and receive, in accordance with the control signaling, a report that indicates the set of separate inter-UE CLI metrics for the set of resources.

Another apparatus for wireless communications at a UE is described. The apparatus may include: means for transmitting or receiving control signaling that indicates a set of resources to monitor for inter-UE CLI and a set of separate inter-UE CLI metrics to report for the set of resources; means for transmitting, in accordance with the control signaling, one or more reference signals via the set of resources; and means for receiving, in accordance with the control signaling, a report that indicates the set of separate inter-UE CLI metrics for the set of resources.

A non-transitory computer-readable medium storing code for wireless communications at a UE is described. The code may include instructions executable by a processor to: transmit or receive control signaling that indicates a set of resources to monitor for inter-UE CLI and a set of separate inter-UE CLI metrics to report for the set of resources; transmit, in accordance with the control signaling, one or more reference signals via the set of resources; and receive, in accordance with the control signaling, a report that indicates the set of separate inter-UE CLI metrics for the set of resources.

In some examples of the methods, apparatuses, and non-transitory computer-readable media described herein, transmitting or receiving the control signaling may include operations, features, means, or instructions for transmitting or receiving, via the control signaling, an indication of a CSI report configuration identifying the set of separate inter-UE CLI metrics that include at least a CLI-RSRP, or a CLI-RSSI, or a CLI-SINR, or a combination thereof.

In some examples of the methods, apparatuses, and non-transitory computer-readable media described herein, transmitting or receiving the control signaling may include operations, features, means, or instructions for transmitting or receiving, via the control signaling, an indication of a CSI resource configuration identifying the set of resources to monitor for inter-UE CLI, the set of resources including one of an SRS resource or resource set or an RSSI resource or resource set.

In some examples of the methods, apparatuses, and non-transitory computer-readable media described herein, transmitting or receiving the control signaling may include operations, features, means, or instructions for transmitting or receiving, via the control signaling, an indication of a CLI resource configuration identifying the set of resources to monitor for inter-UE CLI, the set of resources including an SRS resource set, an RSSI resources set, or both.

In some examples of the methods, apparatuses, and non-transitory computer-readable media described herein, transmitting or receiving the control signaling may include operations, features, means, or instructions for transmitting or receiving, via the control signaling, an indication of a CSI resource configuration identifying a CSI-IM resource set list that includes at least a subset of the set of resources to monitor for inter-UE CLI, the subset including one or more dedicated CMRs or IMRs.

In some examples of the methods, apparatuses, and non-transitory computer-readable media described herein, the set of resources include a CSI-IM resource that is used for CLI-RSSI measurement.

In some examples of the methods, apparatuses, and non-transitory computer-readable media described herein, transmitting or receiving the control signaling may include operations, features, means, or instructions for transmitting or receiving, via the control signaling, an indication of a CSI resource configuration identifying the set of separate inter-UE CLI metrics, a CLI resource set, a NZP CSI-RS resource set, and a linkage between at least one CMR of the NZP CSI-RS resource set and one or more IMRs of the CLI resource set, where the set of separate inter-UE CLI metrics include at least a CLI-SINR.

In some examples of the methods, apparatuses, and non-transitory computer-readable media described herein, transmitting or receiving the control signaling may include operations, features, means, or instructions for transmitting or receiving, via the control signaling, an indication of a CSI report configuration identifying the set of resources to monitor for channel or CLI, the set of resources including an SRS resource set, an RSSI resource set, or both.

In some examples of the methods, apparatuses, and non-transitory computer-readable media described herein, transmitting or receiving the control signaling may include operations, features, means, or instructions for transmitting or receiving, via the control signaling, an indication of a CLI report configuration identifying the set of resources to monitor for inter-UE CLI, the set of resources including an SRS resource set, an RSSI resource set, or both.

In some examples of the methods, apparatuses, and non-transitory computer-readable media described herein, transmitting or receiving the control signaling may include operations, features, means, or instructions for transmitting or receiving, via the control signaling, an indication of a CSI report configuration including a report quantity field that indicates the set of separate inter-UE CLI metrics including at least one of a CLI-RSRP, a CLI-RSSI, or a CLI-SINR.

In some examples of the methods, apparatuses, and non-transitory computer-readable media described herein, transmitting or receiving the control signaling may include operations, features, means, or instructions for transmitting or receiving, via the control signaling, an indication of an aperiodic CSI report trigger state configuration identifying the set of resources to monitor for inter-UE CLI, the set of resources including an SRS resources set, an RSSI resource set, or both.

In some examples of the methods, apparatuses, and non-transitory computer-readable media described herein, the aperiodic CSI report trigger state configuration further indicates QCL type-D information to use for CLI reference signal reception and receive beam measurement.

In some examples of the methods, apparatuses, and non-transitory computer-readable media described herein, transmitting or receiving the control signaling may include operations, features, means, or instructions for transmitting or receiving, via the control signaling, an indication of an aperiodic CLI report trigger state configuration identifying the set of resources to monitor for inter-UE CLI, the set of resources including an SRS resources set, an RSSI resource set, or both.

DETAILED DESCRIPTION

Figure 1:
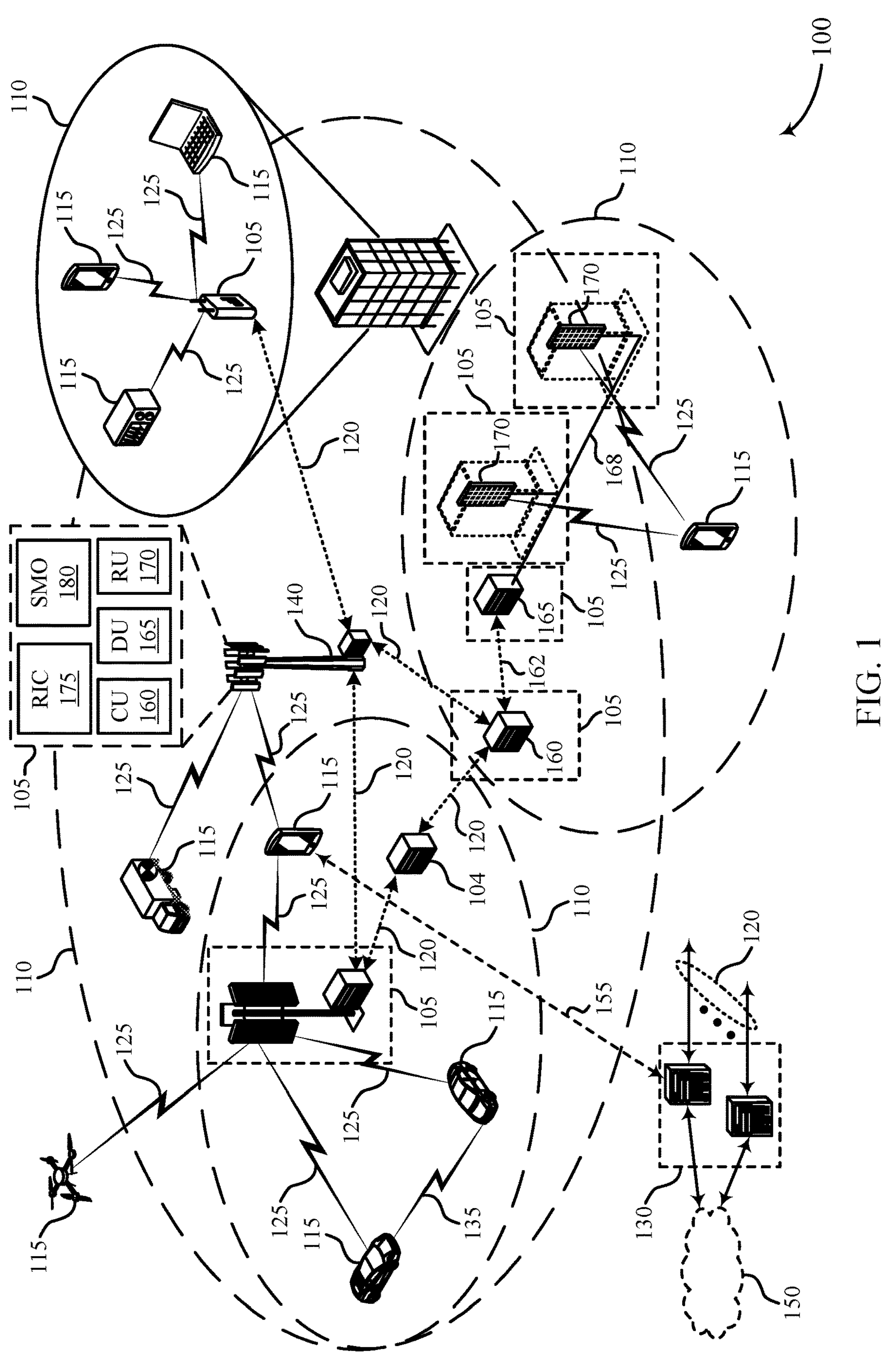
FIGS. 1 through 3 show examples of wireless communications systems that support techniques for reporting separate cross-link interference (CLI) metrics in accordance with one or more aspects of the present disclosure.

Some wireless communications systems may support full-duplex communications, where a single device performs concurrent transmission and reception. In a sub-band full-duplex (SBFD) communication scheme, a communication device may use different portions of a component carrier (CC) bandwidth to perform uplink and downlink communications in the same slot, so as to reduce the likelihood of interference between the uplink and downlink communications. In an in-band full-duplex communication scheme, uplink resources may overlap (partially or fully) with downlink resources. In such cases, other multiplexing techniques, such as code division multiple access (CDMA), can be used to distinguish between uplink communications and downlink communications that overlap in time and/or frequency.

In some cases, full-duplex communications at one communication device may cause cross-link interference (CLI) at another communication device. For example, uplink communications from a first user equipment (UE) may interfere with a second UE that is attempting to receive downlink communications from a network node. CLI may result in lower throughout, decreased communication reliability, higher interference, etc. In some cases, existing channel state information (CSI) reporting techniques can be used to estimate and/or mitigate CLI. However, it may be desirable to have dedicated (i.e., independent) CLI reporting techniques as well.

In accordance with aspects of the present disclosure, a UE may be configured to measure and report dedicated layer 1 (L1) CLI metrics, such as a CLI received signal strength indicator (CLI-RSSI), a CLI reference signal received power (CLI-RSRP), or a CLI signal to interference and noise ratio (CLI-SINR). As an example, a UE may receive control signaling that indicates a set of CLI resources to monitor for inter-UE CLI and a set of dedicated inter-UE CLI metrics for the UE to report for the set of CLI resources. The UE may monitor the set of CLI resources in accordance with the control signaling to determine the set of separate inter-UE CLI metrics for the set of CLI resources. The UE may transmit, in accordance with the control signaling, a measurement report that indicates the set of separate inter-UE CLI metrics for the set of CLI resources.

In some implementations, the control signaling may indicate at least a channel state information (CSI) resource configuration, or a CSI report configuration, or a CLI resource configuration, or a CLI report configuration, or a CSI aperiodic trigger state configuration, or a CLI aperiodic trigger state configuration, or a combination thereof. In some implementations, the CLI resources may include at least a CSI-RSSI resource set, or a CSI sounding reference signal (SRS) resource set, or a channel measurement resource (CMR) set, or an interference measurement resource (IMR) set, or a non-zero power (NZP) CSI reference signal (CSI-RS) resource set, or a combination thereof. In some examples, the set of dedicated inter-UE CLI metrics may be indicated by a Report Quantity field of the CSI report configuration or the CLI report configuration.

Aspects of the present disclosure may be implemented to realize one or more of the following advantages. The techniques described herein may enable communication devices to perform full-duplex communications with greater reliability by enabling UEs to measure and report dedicated CLI metrics such as CLI-RSRP, CLI-RSSI, and CLI-SINR. These metrics may enable a victim UE to mitigate or otherwise compensate for inter-UE CLI caused by an aggressor UE, thereby improving the likelihood of successful communications at the victim UE. The described techniques may also promote greater signaling flexibility and reduced signaling overhead, among other benefits.

Aspects of the disclosure are initially described in the context of wireless communications systems, signaling diagrams, and process flows. Aspects of the disclosure are further illustrated by and described with reference to apparatus diagrams, system diagrams, and flowcharts that relate to techniques for reporting separate CLI metrics.

FIG. 1 shows an example of a wireless communications system 100 that supports techniques for reporting separate CLI metrics in accordance with one or more aspects of the present disclosure. The wireless communications system 100 may include one or more network nodes 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network nodes 105 may be dispersed throughout a geographic area to form the wireless communications system 100 and may include devices in different forms or having different capabilities. In various examples, a network node 105 may be referred to as a network element, a mobility element, a radio access network (RAN) node, or network equipment, among other nomenclature. In some examples, network nodes 105 and UEs 115 may wirelessly communicate via one or more communication links 125 (e.g., a radio frequency (RF) access link). For example, a network node 105 may support a coverage area 110 (e.g., a geographic coverage area) over which the UEs 115 and the network node 105 may establish one or more communication links 125. The coverage area 110 may be an example of a geographic area over which a network node 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network nodes 105, as shown in FIG. 1.

As described herein, a node of the wireless communications system 100, which may be referred to as a network node, or a wireless node, may be a network node 105 (e.g., any network node described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network node 105. As another example, a first node may be configured to communicate with a second node or a third node. In one aspect of this example, the first node may be a UE 115, the second node may be a network node 105, and the third node may be a UE 115. In another aspect of this example, the first node may be a UE 115, the second node may be a network node 105, and the third node may be a network node 105.

In yet other aspects of this example, the first, second, and third nodes may be different relative to these examples. Similarly, reference to a UE 115, network node 105, apparatus, device, computing system, or the like may include disclosure of the UE 115, network node 105, apparatus, device, computing system, or the like being a node. For example, disclosure that a UE 115 is configured to receive information from a network node 105 also discloses that a first node is configured to receive information from a second node.

In some examples, network nodes 105 may communicate with the core network 130, or with one another, or both. For example, network nodes 105 may communicate with the core network 130 via one or more backhaul communication links 120 (e.g., in accordance with an S1, N2, N3, or other interface protocol). In some examples, network nodes 105 may communicate with one another via a backhaul communication link 120 (e.g., in accordance with an X2, Xn, or other interface protocol) either directly (e.g., directly between network nodes 105) or indirectly (e.g., via a core network 130). In some examples, network nodes 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network nodes 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network node 105 (e.g., a base station 140) may be implemented in an aggregated (e.g., monolithic, standalone) base station architecture, which may be configured to utilize a protocol stack that is physically or logically integrated within a single network node 105 (e.g., a single RAN node, such as a base station 140).

In some examples, a network node 105 may be implemented in a disaggregated architecture (e.g., a disaggregated base station architecture, a disaggregated RAN architecture), which may be configured to utilize a protocol stack that is physically or logically distributed among two or more network nodes 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network node 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network nodes 105 in a disaggregated RAN architecture may be co-located, or one or more components of the network nodes 105 may be located in distributed locations (e.g., separate physical locations). In some examples, one or more network nodes 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160.

Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network nodes 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network nodes 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network node 105 (e.g., a donor base station 140). The one or more donor network nodes 105 (e.g., IAB donors) may be in communication with other network nodes 105 (e.g., IAB nodes 104) via supported access and backhaul links (e.g., backhaul communication links 120).

IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for reporting separate CLI metrics as described herein. For example, some operations described as being performed by a UE 115 or a network node 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network nodes 105 and the network equipment including macro eNBs or gNBs, small cell eNBs or gNBs, or relay base stations, among other examples, as shown in FIG. 1.

The UEs 115 and the network nodes 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation.

A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network node 105 and other devices may refer to communication between the devices and any portion (e.g., entity, sub-entity) of a network node 105. For example, the terms "transmitting," "receiving," or "communicating," when referring to a network node 105, may refer to any portion of a network node 105 (e.g., a base station 140, a CU 160, a DU 165, a RU 170) of a RAN communicating with another device (e.g., directly or via one or more other network nodes 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network nodes 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network node 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network node 105. In some other examples, the overlapping coverage areas 110 associated with different technologies may be supported by different network nodes 105. The wireless communications system 100 may include, for example, a heterogeneous network in which different types of the network nodes 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network node 105 (e.g., a base station 140, an RU 170), which may support aspects of such D2D communications being configured by (e.g., scheduled by) the network node 105. In some examples, one or more UEs 115 of such a group may be outside the coverage area 110 of a network node 105 or may be otherwise unable to or not configured to receive transmissions from a network node 105. In some examples, groups of the UEs 115 communicating via D2D communications may support a one-to-many (1:M) system in which each UE 115 transmits to each of the other UEs 115 in the group. In some examples, a network node 105 may facilitate the scheduling of resources for D2D communications. In some other examples, D2D communications may be carried out between the UEs 115 without an involvement of a network node 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network nodes 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network nodes 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network node 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network node 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network node 105 may be located at diverse geographic locations. A network node 105 may include an antenna array with a set of rows and columns of antenna ports that the network node 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network node 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network node 105 or a UE 115 may use beam sweeping techniques as part of beamforming operations. For example, a network node 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network node 105 multiple times along different directions. For example, the network node 105 may transmit a signal according to different beamforming weight sets associated with different directions of transmission. Transmissions along different beam directions may be used to identify (e.g., by a transmitting device, such as a network node 105, or by a receiving device, such as a UE 115) a beam direction for later transmission or reception by the network node 105.

Some signals, such as data signals associated with a particular receiving device, may be transmitted by transmitting device (e.g., a transmitting network node 105, a transmitting UE 115) along a single beam direction (e.g., a direction associated with the receiving device, such as a receiving network node 105 or a receiving UE 115). In some examples, the beam direction associated with transmissions along a single beam direction may be determined based on a signal that was transmitted along one or more beam directions. For example, a UE 115 may receive one or more of the signals transmitted by the network node 105 along different directions and may report to the network node 105 an indication of the signal that the UE 115 received with a highest signal quality or an otherwise acceptable signal quality.

In some examples, transmissions by a device (e.g., by a network node 105 or a UE 115) may be performed using multiple beam directions, and the device may use a combination of digital precoding or beamforming to generate a combined beam for transmission (e.g., from a network node 105 to a UE 115). The UE 115 may report feedback that indicates precoding weights for one or more beam directions, and the feedback may correspond to a configured set of beams across a system bandwidth or one or more subbands. The network node 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network node 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network node 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In accordance with aspects of the present disclosure, a UE 115 may receive control signaling that indicates a set of CLI resources to monitor for inter-UE CLI and a set of separate (i.e., dedicated, independent) inter-UE CLI metrics for the UE 115 to report for the set of CLI resources. The UE 115 may monitor, in accordance with the control signaling, the set of CLI resources to determine the set of separate inter-UE CLI metrics for the set of CLI resources. The UE 115 may transmit, in accordance with the control signaling, a report that indicates the set of separate inter-UE CLI metrics for the set of CLI resources. The techniques described herein may enable UEs 115 to more effectively measure, report, and mitigate CLI (such as inter-sub-band, inter-cell, inter-UE CLI), thereby improving the likelihood of successful communications at the UEs 115.

Figure 2:
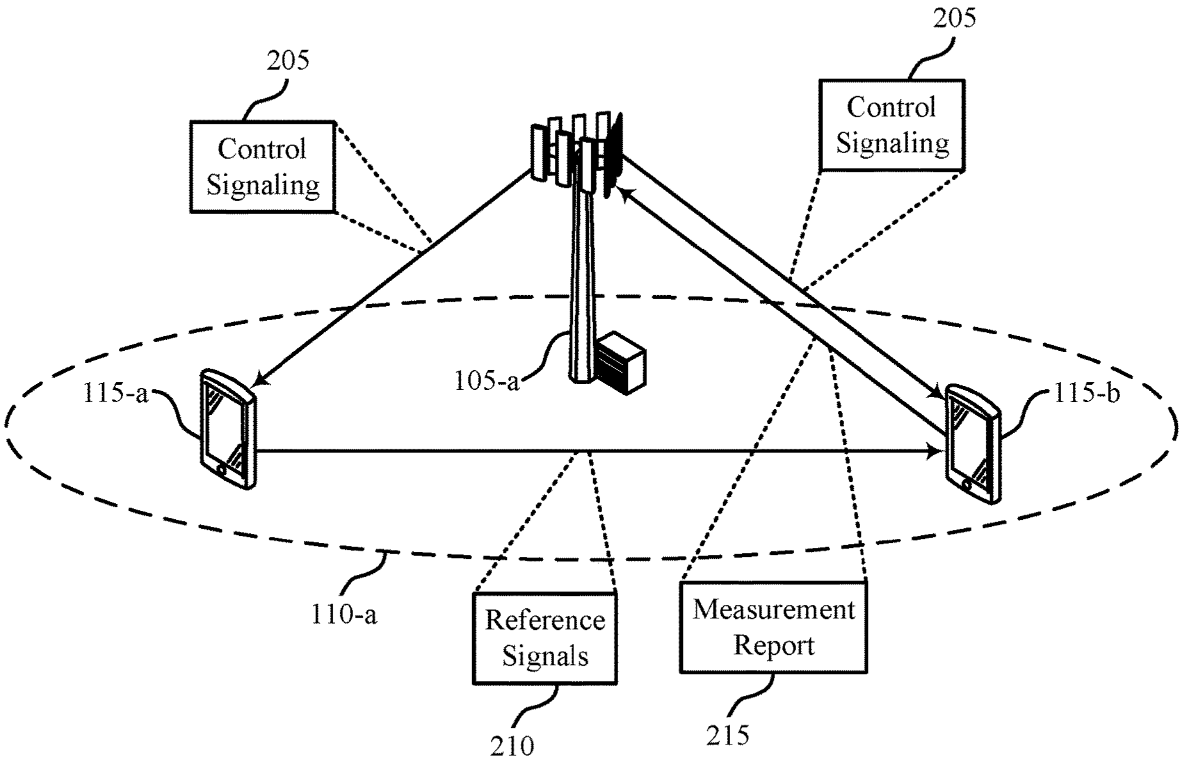

FIG. 2 shows an example of a wireless communications system 200 that supports techniques for reporting separate CLI metrics in accordance with one or more aspects of the present disclosure. The wireless communications system 200 may implement or be implemented by aspects of the wireless communications system 100. For example, the wireless communications system 200 includes a UE 115-*a*, a UE 115-*b*, and a network node 105-*a* (also referred to herein as a gNB), which may be examples of corresponding devices described herein, including with reference to FIG. 1. The network node 105-*a* and the UEs 115 may communicate within a coverage area 110-*a*, which may be an example of the coverage areas 110 described with reference to FIG. 1.

As described herein, the wireless communications system 200 may support full-duplex communications, where a single device (such as the network node 105-*a*) performs concurrent transmission and reception. In a SBFD communication scheme, a communication device may use different portions of a CC bandwidth to perform uplink and downlink communications in the same slot, so as to reduce the likelihood of interference between the uplink and downlink communications. In an in-band full-duplex communication scheme, uplink resources may overlap (partially or fully) with downlink resources. In such cases, other multiplexing techniques (such as CDMA), can be used to distinguish between uplink communications and downlink communications that overlap in time and/or frequency.

In some cases, full-duplex communications from one communication device may cause interference. For example, if the network node 105-*a* transmits a downlink message to the UE 115-*a* while attempting to receive an uplink message from the UE 115-*b*, transmission of the downlink message may interfere with reception of the uplink message. This type of interference is known as self-interference. Full-duplex communications (or any type of outgoing transmission) can also cause CLI at other communication devices. For example, uplink communications from the UE 115-*a* may interfere with reception of downlink communications at the UE 115-*b*. CLI may result in lower throughout, decreased communication reliability, higher interference, etc. In some cases, CSI reporting techniques can be used to estimate and/or mitigate CLI. However, it may be desirable to have dedicated (i.e., independent) CLI reporting techniques as well.

In accordance with aspects of the present disclosure, the UE 115-*b* may be configured to measure and report dedicated L1 CLI metrics, such as CLI-RSSI, CLI-RSRP, or CLI-SINR. The UE 115-*b* may provide these dedicated L1 CLI metrics to one or both of the UE 115-*a* (i.e., the aggressor UE) or the network node 105-*a* via a measurement report 215. As an example, the UE 115-*a* may receive control signaling 205 that indicates a set of CLI resources to monitor for inter-UE CLI and a set of dedicated inter-UE CLI metrics for the UE 115-*b* to report for the set of CLI resources. The UE may monitor the set of CLI resources for a set of reference signals 210 in accordance with the control signaling, and may determine the set of separate inter-UE CLI metrics based on measurements of the reference signals 210. The UE may transmit, in accordance with the control signaling, a measurement report 215 that indicates the set of separate inter-UE CLI metrics for the set of CLI resources.

In some implementations, the control signaling 205 may indicate at least a CSI resource configuration, or a CSI report configuration, or a CLI resource configuration, or a CLI report configuration, or a CSI aperiodic trigger state configuration, or a CLI aperiodic trigger state configuration, or a combination thereof. In some implementations, the CLI resources may include at least a CSI-RSSI resource set, or a CSI-SRS resource set, or a CMR set, or an IMR set, or an NZP CSI-RS resource set, or a combination thereof. In some examples, the set of dedicated inter-UE CLI metrics may be configured or otherwise indicated by a Report Quantity field of the CSI report configuration or the CLI report configuration.

Aspects of the wireless communications system 200 may be implemented to realize one or more of the following advantages. The techniques described with reference to FIG. 2 may enable communication devices (such as the network node 105-*a* and the UEs 115) to perform full-duplex communications with greater reliability by enabling the UEs 115 to measure and report dedicated CLI metrics such as CLI-RSRP, CLI-RSSI, and CSI-SINR. These metrics may enable a victim UE (i.e., the UE 115-*b*) to mitigate or otherwise compensate for inter-UE CLI caused by an aggressor UE (i.e., the UE 115-*a*), thereby improving the likelihood of successful communications at the victim UE. The described techniques may also promote greater signaling flexibility and reduced signaling overhead, among other benefits.

Figure 3:
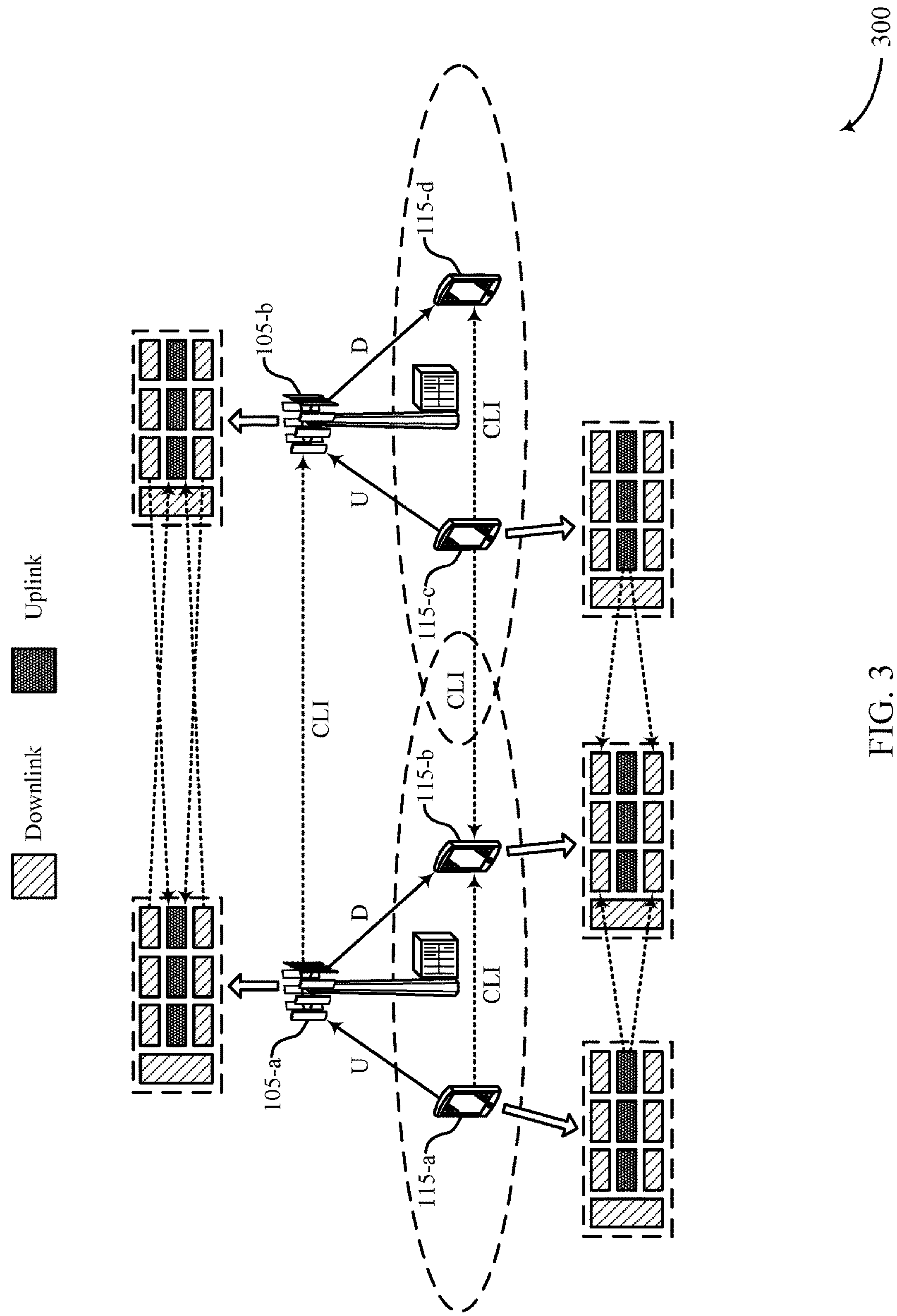

FIG. 3 shows an example of a wireless communications system 300 that supports techniques for reporting separate CLI metrics in accordance with one or more aspects of the present disclosure. The wireless communications system 300 may implement or be implemented by aspects of the wireless communications system 100 or the wireless communications system 200. For example, the wireless communications system 300 includes a UE 115-*a*, a UE 115-*b*, a UE 115-*c*, a UE 115-*d*, a network node 105-*a*, and a network node 105-*b*, which may be examples of corresponding devices described herein, including with reference to FIGS. 1 and 2. The wireless communications system 300 illustrates various examples of CLI that can result from full-duplex communications between the UEs 115 and the network nodes 105.

As described herein, some wireless communications systems may support NR duplex operations, such as NR duplex evolution, sub-band non-overlapping full-duplex communications, dynamic/flexible TDD, NR TDD in unpaired spectrum, duplex enhancements (gNB side), and half-duplex operations (UE side), without restrictions on frequency ranges. For sub-band non-overlapping full-duplex communications with dynamic/flexible TDD, inter-sub-band CLI and inter-sub-band CLI may affect system performance and/or legacy coexistence in co-channel and adjacent channels. Other forms of interference, such as self-interference, inter-sub-band CLI, inter-operator CLI (gNB), inter-sub-band CLI (UE), and inter-operator CLI (UE) may affect system performance and/or adjacent channel co-existence.

CLI may affect antenna/RF and algorithm design parameters, such as antenna isolation, transmission interference measurement suppression (RX), filtering, and digital interference suppression. These factors may be considered when deploying duplex enhancements in TDD unpaired spectrum. In some wireless communications systems that support downlink MU-MIMO and uplink MU-MIMO for full-duplex communications, self-interference and/or clutter may adversely impact full-duplex devices (such as the network nodes 105).

In SBFD deployments, uplink communications from the UE 115-*a* may cause inter-sub-band intra-cell inter-UE CLI at the UE 115-*b*, and uplink communications from the UE 115-*c* may cause inter-sub-band inter-cell inter-UE CLI at the UE 115-*b*. Similarly, downlink communications from the network node 105-*a* may cause inter-sub-band inter-gNB CLI at the network node 105-*b*, and downlink communications from the network node 105-*b* may cause inter-sub-band inter-gNB CLI at the network node 105-*a*. In partial or fully overlapped full-duplex scenarios, downlink communications from the network node 105-*a* may cause in-band inter-gNB CLI at the network node 105-*b* (and vice versa). Similarly, uplink communications from the UE 115-*a* may cause in-band intra-cell inter-UE CLI at the UE 115-*b*, and uplink communications from the UE 115-*c* may cause in-band inter-cell inter-UE CLI at the UE 115-*b*.

The wireless communications system 300 may support SBFD in a TDD carrier or intra-band CA-based communication scheme. As described herein, SBFD refers to a full-duplex communication scheme in which downlink resources and uplink resources occupy different portions of a CC bandwidth for a given slot. In other words, SBFD refers to simultaneous transmission and reception of downlink and uplink communications on a sub-band basis. In the example of FIG. 3, the network node 105-*a* and the network node 105-*b* may be examples of full-duplex gNBs that support simultaneous transmission and reception in the same slot.

SBFD communication schemes may support uplink duty cycle increases thereby promoting reduced latency and improved uplink coverage. For example, in a SBFD communication scheme, communication devices can transmit uplink signals in an uplink sub-band in downlink or flexible slots, or receive downlink signals in downlink sub-band(s) in legacy uplink slots, which can provide latency savings. SBFD communication schemes can also provide uplink coverage improvements, system capacity enhancements, resource utilization improvements, and greater spectral efficiency. Further, SBFD communications may support flexible and dynamic uplink/downlink resource adaptation according to uplink/downlink traffic in a robust manner.

Aspects of the present disclosure support techniques for inter-UE CLI mitigation for dynamic TDD scenarios, such as sub-band non-overlapping full-duplex communications, or partially-overlapping full-duplex communications, fully-overlapping full-duplex communications, or a combination thereof. For L1 or L2-based UE-to-UE CLI measurements, SRS-RSRP and CLI-RSSI may be used as baseline metrics. For L1/L2-based UE-to-UE co-channel CLI measurement, measurement resources for CLI-RSSI measurement and SRS resources for SRS-RSRP measurement can be used. For L1/L2-based UE-to-UE co-channel CLI measurement and reporting, a CSI framework may be used, but other frameworks are not precluded.

As described herein, for L1/L2-based UE-to-UE CLI measurement, SRS-RSRP and CLI-RSSI can be used as baseline metrics. CLI may be explicitly reported as independent CLI metrics that include SRS-RSRP and CLI-RSSI. That is, SRS-RSRP and CLI-RSSI may be used as dedicated reporting metrics for CLI measurement. To support this functionality, a reportQuantity field in a CSI report configuration may be added or updated to include support for SRS-RSRP and CLI-RSSI.

Figure 4:
FIGS. 4 and 5 show examples of signaling diagrams that support techniques for reporting separate CLI metrics in accordance with one or more aspects of the present disclosure.
Figure 4:
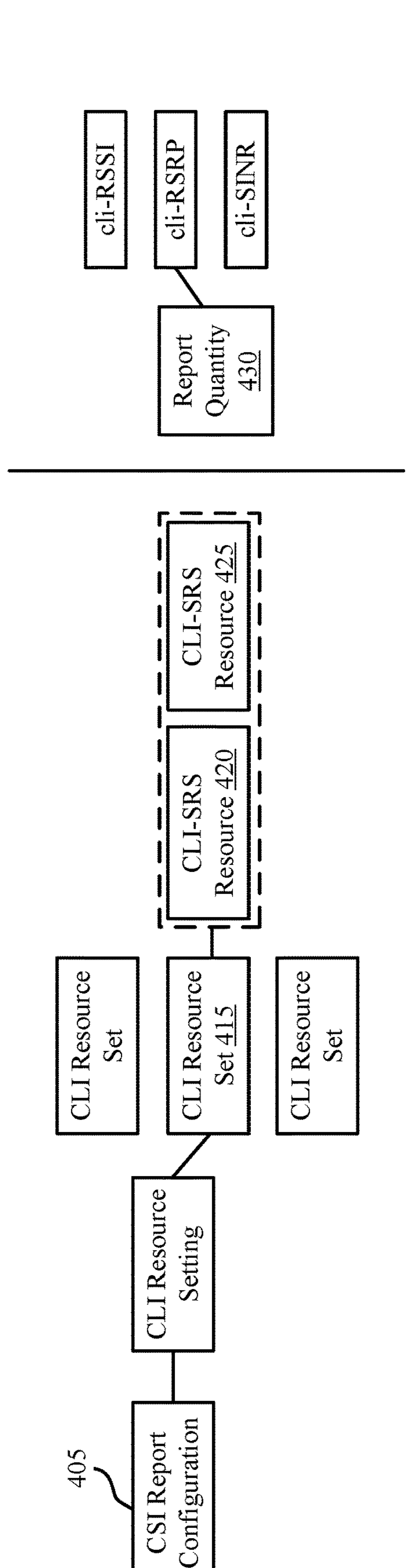

FIG. 4 shows an example of a signaling diagram 400 that supports techniques for reporting separate CLI metrics in accordance with one or more aspects of the present disclosure. The signaling diagram 400 may implement or be implemented by aspects of any of the wireless communications systems described with reference to FIGS. 1 through 3. For example, the signaling diagram 400 includes a CSI report configuration 405, which may be provided via the control signaling 205 described with reference to FIG. 2. In the signaling diagram 400, a UE (such as the UE 115-*b* described with reference to FIGS. 2 and 3) may receive an indication of the CSI report configuration 405 that identifies a CLI resource set 415 to monitor for inter-UE CLI measurements.

In accordance with the techniques described herein, a CLI resource configuration may be used to indicate a CLI resource set 415. To support such functionality, a new CLI-Resource field may be added to a CSI Resource Configuration information element (IE). Alternatively, a separate CLI Resource Configuration IE (similar to the CSI Resource Configuration IE) can be used to indicate CLI resources. In other examples, new CLI resource field(s) may be added to a CSI report configuration IE, or a separate CLI report configuration IE can be used. In some implementations, CSI-IM/IMR resources can be re-purposed as CLI resources (e.g., CLI-RSSI under the same IE). In other implementations, both NZP CSI-RS and CLI-Resources may be included for cli-SINR reports with CMR and IMRs. The described techniques may also support using a CLI resource indicators, similar to a CSI-RS resource indicator (CRI).

In the example of FIG. 4, the CLI resource set 415 includes a CLI-SRS resource 420 and a CLI-SRS resource 425. However, in other examples, the CLI resource set 415 may include additional or alternative CLI resources configured by the gNB, such as CLI SRS-RSRP resources, CLI-RSSI resources, dedicated IMR/CMR resources, etc. In some implementations, the CLI resource set 415 may be indicated by a CSI-ResourceConfig IE, which may define a group of one or more NZP-CSI-RS-ResourceSet(s), CSI-IM-ResourceSet(s) and/or CSI-SSB-ResourceSet(s). The CSI-ResourceConfig IE (also referred to herein as a CSI report configuration) may include the following parameters:

```
CSI-ResourceConfig ::=                    SEQUENCE {
   csi-ResourceConfigId                   ,
   csi-RS-ResourceSetList                   CHOICE {
      nzp-CSI-RS-SSB                           SEQUENCE {
         nzp-CSI-RS-ResourceSetList SEQUENCE (SIZE
(1..maxNrofNZP-CSI-RS-ResourceSetsPerConfig)) OF NZP-CSI-RS-ResourceSetId
OPTIONAL, -- Need R
         csi-SSB-ResourceSetList                        SEQUENCE (SIZE
(1..maxNrofCSI-SSB-ResourceSetsPerConfig)) OF CSI-SSB-ResourceSetId
OPTIONAL -- Need R
            csi-IM-ResourceSetList                        SEQUENCE (SIZE
(1..maxNrofCSI-IM-ResourceSetsPerConfig)) OF CSI-IM-ResourceSetId
   },
   cli-ResourceSetList                  CHOICE {
      srs-ResourceSet                        SEQUENCE (SIZE (1..maxNrofCLI-SRS-ResourceList))
OF SRS-ResourceListId}
      rssi-ResourceSet                     SEQUENCE (SIZE (1..maxNrofCLI-RSSI-ResourceList))
OF RSSI-ResourceListId},
   },
   bwp-Id                             BWP-Id,
   resourceType                         ENUMERATED { aperiodic, semiPersistent, periodic },
   ...,
   [[
   csi-SSB-ResourceSetListExt-r17                      CSI-SSB-ResourceSetId
OPTIONAL -- Need R
   ]]
}
```

In some implementations, the CSI-ResourceConfig IE format may remain unchanged, and a CSI-ReportConfig IE may be updated to include CLI resource field(s). In other implementations, a new resource for CLI-RSRP and/or CLI-RSSI under the CSI-ResourceConfig IE can be used to measure and report separate CLI metrics. If the CSI-ResourceConfig IE is used to indicate dedicated CLI resources, some fields (such as csi-RS-ResourceSetList, nzp-CSI-RS-SSB, nzp-CSI-RS-ResourceSetList, csi-SSB-ResourceSetList, and csi-IM-ResourceSetList) may be optional.

In other implementations, a new CLI-ResourceConfig IE (also referred to as a CLI measurement resource configuration) may be used to indicate CLI resources for CLI-RSRP or CLI-RSSI (such as the CLI resource set 415) to measure and report separate CLI metrics. The CLI-ResourceConfig IE may include the following parameters:

```
CLI-ResourceConfig ::=          SEQUENCE {
   cli-ResourceConfigId          ,
   cli-ResourceSetList          CHOICE {
      srs-ResourceSet              SEQUENCE (SIZE (1..maxNrofCLI-SRS-ResourceList))
OF SRS-ResourceListId}
         rssi-ResourceSet            SEQUENCE (SIZE
(1..maxNrofCLI-RSSI-ResourceList)) OF RSSI-ResourceListId},
   },
   bwp-Id                     BWP-Id,
   resource Type                ENUMERATED { aperiodic, semiPersistent, periodic },
   ...,
}
```

In some examples, a new CLI resource may be added under the csi-IM-ResourceSetList field of the CSI-ResourceConfig IE as an option for CLI-RSRP or CLI-RSSI to measure and report separate CLI metrics. The csi-IM-ResourceSetList field may be updated to include CLI resources as IMRs. In other examples, both NZP CSI-RS and CLI-Resources may be included for cli-SINR report with CMR (indicated by the nzp-CSI-RS-SSB field) and IMRs for CLI (indicated by the cli-ResourceSetList field), as described with reference to FIG. 5.

In other implementations, the CSI-ReportConfig IE (also referred to herein as a CSI report configuration) may be updated to capture CLI resources (such as the CLI resource set 415) as dedicated IMRs to measure CLI. In such examples, the CSI-ReportConfig IE may remain unchanged. The CSI-ReportConfig IE may include the following parameters:

```
CSI-ReportConfig ::=                     SEQUENCE
   reportConfigId                          CSI-ReportConfigId,
   carrier                               ServCellIndex              OPTIONAL, -- Need S
   resourcesForChannelMeasurement                    CSI-ResourceConfigId,
   csi-IM-ResourcesForInterference                  CSI-ResourceConfigId
OPTIONAL, -- Need R
delete   nzp-CSI-RS-ResourcesForInterference      CSI-ResourceConfigId
OPTIONAL, -- Need R
     cli-ResourceForInterference              CHOICE {
        srs-ResourceSet                   SEQUENCE (SIZE (1..maxNrofCLI-SRS-ResourceList))
OF SRS-ResourceSetId}
           rssi-ResourceSet                 SEQUENCE (SIZE
(1..maxNrofCLI-RSSI-ResourceList)) OF RSSI-ResourceSetId},
      },
reportConfigType                          CHOICE {
      periodic                             SEQUENCE {
         reportSlotConfig                          CSI-ReportPeriodicityAndOffset,
         pucch-CSI-ResourceList                       SEQUENCE (SIZE (1..maxNrofBWPs)) OF
PUCCH-CSI-Resource
      },
      semiPersistentOnPUCCH                      SEQUENCE {
         reportSlotConfig                        CSI-ReportPeriodicityAndOffset,
         pucch-CSI-ResourceList                       SEQUENCE (SIZE (1..maxNrofBWPs)) OF
PUCCH-CSI-Resource
      },
      semiPersistentOnPUSCH                      SEQUENCE {
         reportSlotConfig                        ENUMERATED {sl5, sl10, sl20, sl40, sl80,
sl160, sl320},
         reportSlotOffsetList                  SEQUENCE (SIZE (1.. maxNrofUL-Allocations))
OF INTEGER(0..32),
         p0alpha                            P0-PUSCH-AlphaSetId
      },
```

-continued

```
    aperiodic                       SEQUENCE {
      reportSlotOffsetList              SEQUENCE (SIZE (1..maxNrofUL-Allocations))
OF INTEGER(0..32)
    }
  },
reportQuantity                    CHOICE {
    none                             NULL,
    cri-RI-PMI-CQI                       NULL,
    cri-RI-i1                        NULL,
    cri-RI-i1-CQI                       SEQUENCE {
      pdsch-BundleSizeForCSI                   ENUMERATED {n2, n4}
OPTIONAL   -- Need S
    },
    cri-RI-CQI                         NULL,
    cri-RSRP                          NULL,
    ssb-Index-RSRP                        NULL,
    cri-RI-LI-PMI-CQI                      NULL
  },
reportQuantity-r16                CHOICE {
    cri-SINR-r16                      NULL,
    ssb-Index-SINR-r16                    NULL
  }
reportQuantity-r19                CHOICE {
     cli-RSRP                                  NULL,
     cli-RSSI                                  NULL,
     cli-SINR                                  NULL,
}
```

Within the CSI-ReportConfig IE, the CSI-ResourceConfigId from the resourcesForChannelMeasurement field may indicate a specific CLI resource or resource set. If the resourcesForChannelMeasurement field of the CSI-ReportConfig IE is used to indicate CLI resources, some fields (such as csi-IM-ResourcesForInterference and nzp-CSI-RS-ResourcesForInterference) may be optional. If the cli-ResourceForInterference field of the CSI-ReportConfig IE is used to indicate CLI resources, the resourcesForChannelMeasurement field and other fields (such as csi-IM-ResourcesForInterference and nzp-CSI-RS-ResourcesForInterference) may be optional. In such examples, there may be an option to make CMR(s) optional by using CLI resources only for CLI metrics report.

In some examples, CLI-SRS and/or CLI-RSSI resources may be captured as new dedicated resources to measure CLI in the CSI-ReportConfig IE (for example, using the cli-ResourceForInterference field). In other examples, CSI-SRS and/or CLI-RSSI resources may be captured as new dedicated resources to measure CLI in a separate CLI-ReportConfig IE (similar to the CSI-ReportConfig IE). This CLI-ReportConfig IE may also be referred to as a CLI measurement report configuration. The specific type of separate CLI metric to report (such as cli-RSRP, cli-RSSI, cli-SINR, or any combination thereof) may be indicated by the reportQuantity-r19 field 430 of the CSI-ReportConfig IE or the CLI-ReportConfig IE.

In other implementations, a CSI-AperiodicTriggerStateList IE (also referred to herein as an aperiodic CSI report trigger state configuration) may support a CLI measurement triggering mechanism for aperiodic CLI reporting. The CSI-AperiodicTriggerStateList IE may include the following parameters:

```
CSI-AperiodicTriggerStateList ::= SEQUENCE (SIZE
(1..maxNrOfCSI-AperiodicTriggers)) OF CSI-AperiodicTriggerState
CSI-AperiodicTriggerState ::=              SEQUENCE {
   associatedReportConfigInfoList              SEQUENCE
(SIZE(1..maxNrofReportConfigPerAperiodicTrigger)) OF
CSI-AssociatedReportConfigInfo,
   ...,
   [[
   ap-CSI-MultiplexingMode-r17                 ENUMERATED {enabled}
OPTIONAL -- Need R
   ]]
}
CSI-AssociatedReportConfigInfo ::= SEQUENCE {
   reportConfigId                          CSI-ReportConfigId,
   resourcesForChannel                        CHOICE {
      nzp-CSI-RS                            SEQUENCE {
         resourceSet                          INTEGER
(1..maxNrofNZP-CSI-RS-ResourceSetsPerConfig),
         qcl-info                            SEQUENCE
(SIZE(1..maxNrofAP-CSI-RS-ResourcesPerSet)) OF TCI-StateId
                                                        OPTIONAL -- Cond
Aperiodic
   },
   csi-SSB-ResourceSet                         INTEGER
(1..maxNrofCSI-SSB-ResourceSetsPerConfig)
      },
```

-continued

```
  csi-IM-ResourcesForInterference
INTEGER(1..maxNrofCSI-IM-ResourceSetsPerConfig)              OPTIONAL, -- Cond
CSI-IM-ForInterference
  nzp-CSI-RS-ResourcesForInterference INTEGER
(1..maxNrofNZP-CSI-RS-ResourceSetsPerConfig)           OPTIONAL, -- Cond
NZP-CSI-RS-ForInterference
  cli-ResourceForInterference               CHOICE {
    srs-ResourceSet                    SEQUENCE (SIZE (1..maxNrofCLI-SRS-ResourceList)) OF
SRS-ResourceSetId}
        rssi-ResourceSet                  SEQUENCE (SIZE
(1..maxNrofCLI-RSSI-ResourceList)) OF RSSI-ResourceSetId},
          qcl-info                      SEQUENCE
(SIZE(1..maxNrofAP-CLI-ResourcesPerSet)) OF TCI-StateId
                                                        OPTIONAL -- Cond
    },
...,
  [[
  resourcesForChannel2-r17                  CHOICE {
    nzp-CSI-RS2-r17                      SEQUENCE {
      resourceSet2-r17                     INTEGER
(1..maxNrofNZP-CSI-RS-ResourceSetsPerConfig),
      qcl-info2-r17                      SEQUENCE
(SIZE(1..maxNrofAP-CSI-RS-ResourcesPerSet)) OF TCI-StateId
                                                      OPTIONAL -- Cond
Aperiodic
    },
    csi-SSB-ResourceSet2-r17                   INTEGER
(1..maxNrofCSI-SSB-ResourceSetsPerConfigExt)
  }                                                   OPTIONAL, -- Cond
NoUnifiedTCI
  csi-SSB-ResourceSetExt                  INTEGER
(1..maxNrofCSI-SSB-ResourceSetsPerConfigExt)           OPTIONAL -- Need R
  ]]
}
```

The definition of the CSI-AperiodicTriggerStateList IE may be updated to support aperiodic CLI reporting. More specifically, a CLI resource may be added to the CSI-AperiodicTriggerStateList IE to support aperiodic CLI reporting. In such examples, a new qcl-info field under the CLI resource in the CSI-AperiodicTriggerStateList IE may be used for aperiodic CLI measurement. The qcl-info field may refer to a reference signal, such as a reference signal used for quasi-co-location (QCL) type-D reception. Some fields from the CSI-AperiodicTriggerStateList IE (such as resourcesForChannel, csi-IM-ResourcesForInterference, and nzp-CSI-RS-ResourcesForInterference) can be made optional.

In other implementations, a new CLI-AperiodicTriggerStateList IE (also referred to as an aperiodic CLI report trigger state configuration) may be defined to indicate separate CLI resources. The CLI-AperiodicTriggerStateList IE may include the following parameters:

```
CLI-AperiodicTriggerStateList ::= SEQUENCE (SIZE
(1..maxNrOfCLI-AperiodicTriggers)) OF CLI-AperiodicTriggerState
CLI-AperiodicTriggerState ::=                SEQUENCE {
  associatedReportConfigInfoList                SEQUENCE
(SIZE(1..maxNrofReportConfigPerAperiodicTrigger)) OF
CSI-AssociatedReportConfigInfo,
  ...,
  [[
  ap-CLI-MultiplexingMode-r17                ENUMERATED {enabled}
OPTIONAL -- Need R
  ]]
}
CLI-AssociatedReportConfigInfo ::= SEQUENCE {
  reportConfigId                        CSI-ReportConfigId,
    cli-ResourceForInterference                CHOICE {
    srs-ResourceSet                    SEQUENCE (SIZE (1..maxNrofCLI-SRS-ResourceList)) OF
SRS-ResourceSetId}
      rssi-ResourceSet                    SEQUENCE (SIZE
(1..maxNrofCLI-RSSI-ResourceList)) OF RSSI-ResourceSetId},
      qcl-info                        SEQUENCE
(SIZE(1..maxNrofAP-CLI-ResourcesPerSet)) OF TCI-StateId
                                                        OPTIONAL -- Cond
    },
...,
}
```

Figure 5:
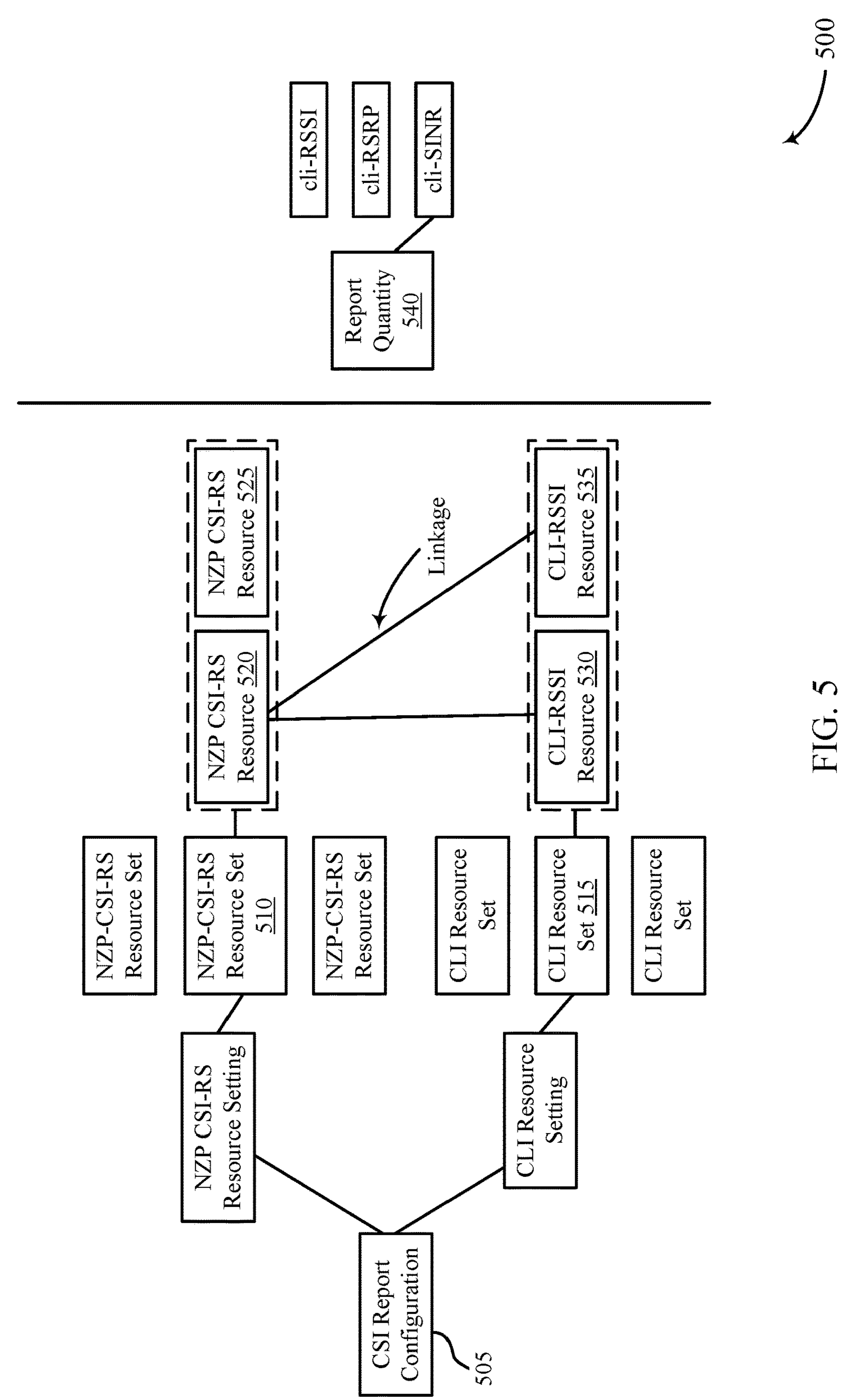

FIG. 5 shows an example of a signaling diagram 500 that supports techniques for reporting separate CLI metrics in accordance with one or more aspects of the present disclosure. The signaling diagram 500 may implement or be implemented by aspects of any of the wireless communications systems described with reference to FIGS. 1 through 3. For example, the signaling diagram 500 includes a CSI report configuration 505, which may provided via the control signaling 205 described with reference to FIG. 2. In the signaling diagram 500, a UE (such as the UE 115-*b* described with reference to FIGS. 2 and 3) may receive an indication of the CSI report configuration 505 that identifies a CLI resource set 515 and an NZP CSI-RS resource set 510 to monitor for inter-UE CLI measurements.

In accordance with the techniques described herein, a CLI resource configuration may be used to indicate a CLI resource set 515. To support such functionality, a new CLI-Resource field may be added to a CSI Resource Configuration IE. Alternatively, a separate CLI Resource Configuration IE (similar to the CSI Resource Configuration IE) can be used to indicate CLI resources. In other examples, new CLI resource field(s) may be added to a CSI report configuration IE, or a separate CLI report configuration IE can be used. In some implementations, CSI-IM/IMR resources can be re-purposed as CLI resources (e.g., CLI-RSSI under the same IE). In other implementations, both NZP CSI-RS resources (such as the NZP CSI-RS resource 520 and the NZP CSI-RS resource 525) and CLI-Resources (such as the CLI-RSSI resource 530 and the CLI-RSSI resource 535) may be included for cli-SINR reports with CMR and IMRs. The described techniques may also support using a CLI resource indicators, similar to a CRI.

In some implementations, at least the CLI resource set 515, or the NZP CSI-RS resource set 510, or both, may be indicated by a CSI-ResourceConfig IE, which defines a group of one or more NZP-CSI-RS-ResourceSet(s), CSI-IM-ResourceSet(s) and/or CSI-SSB-ResourceSet(s) for CLI measurement. In the example of FIG. 5, the CLI resource set 515 includes a CLI-RSSI resource 530 and a CLI-RSSI resource 535. However, in other examples, the CLI resource set 515 may include additional or alternative CLI resources configured by the gNB, such as CLI SRS-RSRP resources, CLI-RSSI resources, dedicated CMR/IMR resources, etc.

In some implementations, the CSI-ResourceConfig IE format may remain unchanged, and a CSI-ReportConfig IE (such as the CSI report configuration 505) may be updated to include CLI resource field(s). In other implementations, a new resource for CLI-RSRP and/or CLI-RSSI under the CSI-ResourceConfig IE can be used to measure and report separate CLI metrics. If the CSI-ResourceConfig IE is used to indicate dedicated CLI resources, some fields of the CSI-ResourceConfig IE may be optional.

In other implementations, a new CLI-ResourceConfig IE may be used to indicate CLI resources for CLI-RSRP or CLI-RSSI (such as the CLI resource set 515) to measure and report separate CLI metrics.

In some examples, a new CLI resource may be added under the csi-IM-ResourceSetList field of the CSI-ResourceConfig IE as an option for CLI-RSRP or CLI-RSSI to measure and report separate CLI metrics. The csi-IM-ResourceSetList field may be updated to include CLI resources as IMRs. In other examples, both NZP CSI-RS resources (such as the NZP CSI-RS resource 520 and the NZP CSI-RS resource 525) and CLI-Resources (such as the CLI-RSSI resource 530 and the CLI-RSSI resource 535) may be included for cli-SINR report with CMR (indicated by the nzp-CSI-RS-SSB field) and IMRs for CLI (indicated by the cli-ResourceSetList field).

In other implementations, the CSI-ReportConfig IE may be updated to capture CLI resources (such as the CLI resource set 515) as dedicated IMRs to measure CLI. In such examples, the CSI-ReportConfig IE may remain unchanged.

Within the CSI-ReportConfig IE, the CSI-ResourceConfigId from the resourcesForChannelMeasurement field may indicate a specific CLI resource or resource set. If the resourcesForChannelMeasurement field of the CSI-ReportConfig IE is used to indicate CLI resources, some fields may be optional. If the cli-ResourceForInterference field of the CSI-ReportConfig IE is used to indicate CLI resources, the resourcesForChannelMeasurement field and other fields may be optional. In such examples, there may be an option to make CMR(s) optional by using CLI resources only for CLI metrics report.

In some examples, CLI-SRS and/or CLI-RSSI resources may be captured as new dedicated resources to measure CLI in the CSI-ReportConfig IE (for example, using the cli-ResourceForInterference field). In other examples, CSI-SRS and/or CLI-RSSI resources may be captured as new dedicated resources to measure CLI in a separate CLI-ReportConfig IE (similar to the CSI-ReportConfig IE). This CLI-ReportConfig IE may also be referred to as a CLI measurement report configuration. The specific type of separate CLI metric to report (such as cli-RSRP, cli-RSSI, or cli-SINR) may be indicated by the reportQuantity-r19 field 540 of the CSI-ReportConfig IE or the CLI-ReportConfig IE.

In other implementations, a CSI-AperiodicTriggerStateList IE may support a CLI measurement triggering mechanism for aperiodic CLI reporting. The definition of the CSI-AperiodicTriggerStateList IE may be updated to support aperiodic CLI reporting. More specifically, a CLI resource may be added to the CSI-AperiodicTriggerStateList IE to support aperiodic CLI reporting. In such examples, a new qcl-info field under the CLI resource in the CSI-AperiodicTriggerStateList IE may be used for aperiodic CLI measurement. The qcl-info field may refer to a reference signal, such as a reference signal used for QCL type-D reception. Some fields of the CSI-AperiodicTriggerStateList IE can be made optional.

In other implementations, a new CLI-AperiodicTriggerStateList IE (also referred to as an aperiodic CLI report trigger state configuration) may be defined to indicate separate CLI resources.

In the example of FIG. 5, both NZP CSI-RS resources and CLI resources may be included for reporting cli-SINR. A gNB (such as the network node 105-*a* described with reference to FIGS. 2 and 3) may configure CMR with linked IMR for reporting cli-SINR metrics. That is, the gNB may signal or otherwise indicate a linkage between one or more resources to be used for channel measurement (such as the NZP CSI-RS resource 520) and one or more resources to be used for interference measurement (such as the CLI-RSSI resource 530 and the CLI-RSSI resource 535) when cli-SINR is to be reported.

Figure 6:
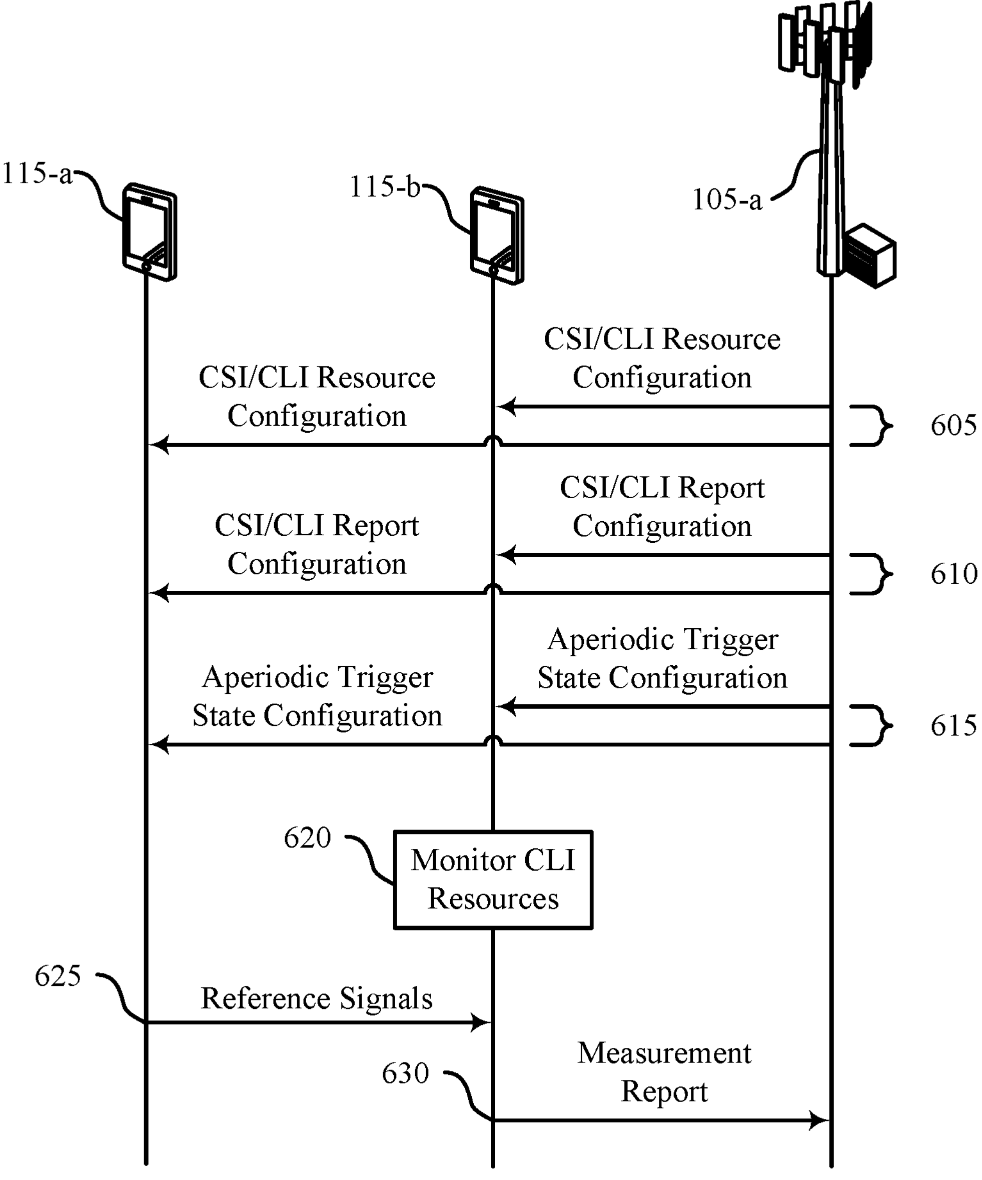
FIG. 6 shows an example of a process flow that supports techniques for reporting separate CLI metrics in accordance with one or more aspects of the present disclosure.

FIG. 6 shows an example of a process flow 600 that supports techniques for reporting separate CLI metrics in accordance with one or more aspects of the present disclosure. The process flow 600 may implement or be implemented by aspects of any of the wireless communications systems or signaling diagrams described with reference to FIGS. 1 through 5. For example, the process flow 600 includes a network node 105-*a*, a UE 115-*a*, and a UE 115-*b*, which may be examples of corresponding devices described herein, including with reference to FIGS. 1 through 3. In the following description of the process flow 600, operations between the network node 105-*a* and the UEs 115 may be added, omitted, or performed in a different order (with respect to the exemplary order shown).

At 605, the network node 105-*a* may transmit control signaling (such as the control signaling 205 described with reference to FIG. 2) that indicates one or both of a CSI resource configuration or a CLI resource configuration. In some implementations, the CSI resource configuration may identify a set of CLI resources to monitor for inter-UE CLI. In other implementations, the CLI resource configuration may identify the set of CLI resources to monitor for inter-UE CLI. The set of CLI resources may include at least a CLI-SRS resource set, or a CLI-RSSI resource set, or a dedicated CMR/IMR set, or a combination thereof.

At 610, the network node 105-*a* may transmit control signaling that indicates one or both of a CSI report configuration or a CLI report configuration. In some implementations, the CSI report configuration may identify a set of dedicated (i.e., separate) CLI metrics to report for the set of CLI resources. The set of dedicated CLI metrics may include at least a CLI-RSSI, or a CLI-RSRP, or a CLI-SINR, or a combination thereof. Additionally, or alternatively, the CSI report configuration may indicate the set of CLI resources for which the UE 115-*b* is to report the set of dedicated CLI metrics. In other implementations, the CLI report configuration may identify the set of dedicated CLI metrics, the set of CLI resources, or both.

At 615, the network node 105-*a* may transmit control signaling that indicates one or both of a CSI aperiodic trigger state configuration or a CLI aperiodic trigger state configuration. In some examples, the CSI aperiodic trigger state configuration may trigger an aperiodic CSI report from the UE 115-*b*. Additionally, or alternatively, the CSI aperiodic trigger state configuration may identify a set of CLI resources to monitor for inter-UE CLI, or QCL information associated with the set of CLI resources, or both. In other examples, the CLI aperiodic trigger state configuration may trigger an aperiodic CLI measurement report from the UE 115-*b*. Additionally, or alternatively, the CLI aperiodic trigger state configuration may identify a set of CLI resources to monitor for inter-UE CLI, or QCL information associated with the set of CLI resources, or both.

At 620, the UE 115-*b* may monitor the set of CLI resources in accordance with at least the CSI resource configuration, or the CLI resource configuration, or the CSI report configuration, or the CLI report configuration, or the CSI aperiodic trigger state configuration, or the CLI aperiodic trigger state configuration, or a combination thereof. At 625, the UE 115-*b* may receive at least one CLI-SRS or NZP CSI-RS from the UE 115-*a* via a CLI-SRS resource set, or a CLI-RSSI resource set, or an NZP CSI-RS resource set, or a dedicated CMR/IMR resources set, or a combination thereof. Accordingly, the UE 115-*b* may determine the set of dedicated CLI metrics (e.g., CLI-RSSI, CLI-RSRP, or CLI-SINR) based on receiving the aforementioned CLI reference signals via the set of CLI resources.

At 630, the UE 115-*b* may transmit a measurement report to the network node 105-*a*, or the UE 115-*a*, or both. The measurement report from the UE 115-*b* may indicate the set of dedicated CLI metrics (e.g., CLI-RSSI, CLI-RSRP, or CLI-SINR) for the set of CLI resources (e.g., CLI-SRS resources, CLI-RSSI resources, NZP CSI-RS resources, dedicated CMR/IMR resources). The techniques described with reference to FIG. 6 may enable communication devices (such as the UEs 115 and the network node 105-*a*) to perform full-duplex communications with greater reliability by enabling the UE 115-*b* to measure and report dedicated CLI metrics. These metrics may enable the UE 115-*b* (i.e., a victim UE) to mitigate or otherwise compensate for inter-UE CLI caused by the UE 115-*a* (i.e., an aggressor UE), thereby improving the likelihood of successful communications at the UE 115-*b*. The described techniques may also promote greater signaling flexibility and reduced signaling overhead, among other benefits.

Figure 7:
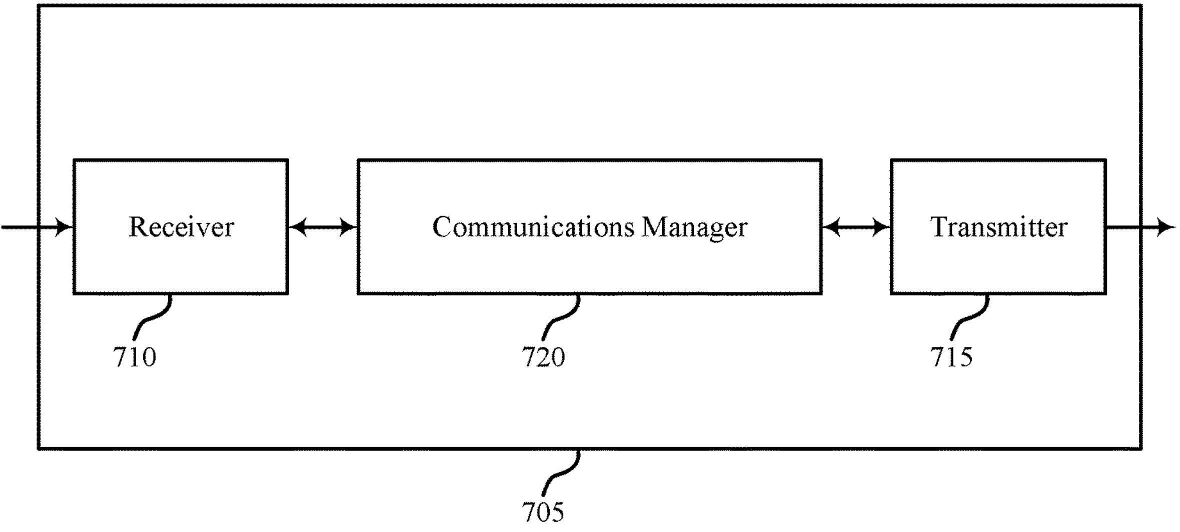
FIGS. 7 and 8 show block diagrams of devices that support techniques for reporting separate CLI metrics in accordance with one or more aspects of the present disclosure.

FIG. 7 shows a block diagram 700 of a device 705 that supports techniques for reporting separate CLI metrics in accordance with one or more aspects of the present disclosure. The device 705 may be an example of aspects of a UE 115 as described herein. The device 705 may include a receiver 710, a transmitter 715, and a communications manager 720. The device 705, or one or more components of the device 705 (e.g., the receiver 710, the transmitter 715, the communications manager 720), may include at least one processor, which may be coupled with at least one memory, to support the CLI measurement and reporting features discussed herein. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for reporting separate CLI metrics). Information may be passed on to other components of the device 705. The receiver 710 may utilize a single antenna or a set of antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for reporting separate CLI metrics). In some examples, the transmitter 715 may be co-located with a receiver 710 in a transceiver module. The transmitter 715 may utilize a single antenna or a set of antennas.

The communications manager 720, the receiver 710, the transmitter 715, or various combinations thereof or various components thereof may be examples of means for performing various aspects of techniques for reporting separate CLI metrics as described herein. For example, the communications manager 720, the receiver 710, the transmitter 715, or various combinations or components thereof may be capable of performing one or more of the functions described herein.

In some examples, the communications manager 720, the receiver 710, the transmitter 715, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by executing, by the at least one processor, instructions stored in the at least one memory).

Additionally, or alternatively, the communications manager 720, the receiver 710, the transmitter 715, or various combinations or components thereof may be implemented in code (e.g., as communications management software or firmware) executed by at least one processor. If implemented in code executed by at least one processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE (such as the device 705) in accordance with examples disclosed herein. For example, the communications manager 720 is capable of, configured to, or operable to support a means for receiving control signaling that indicates a set of resources to monitor for inter-UE CLI and a set of separate inter-UE CLI metrics for the UE to report for the set of resources. The communications manager 720 is capable of, configured to, or operable to support a means for monitoring, in accordance with the control signaling, the set of resources to determine the set of separate inter-UE CLI metrics for the set of resources. The communications manager 720 is capable of, configured to, or operable to support a means for transmitting, in accordance with the control signaling, a report that indicates the set of separate inter-UE CLI metrics for the set of resources.

Additionally, or alternatively, the communications manager 720 may support wireless communications at a UE (such as the device 705) in accordance with examples disclosed herein. For example, the communications manager 720 is capable of, configured to, or operable to support a means for transmitting or receiving control signaling that indicates a set of resources to monitor for inter-UE CLI and a set of separate inter-UE CLI metrics to report for the set of resources. The communications manager 720 is capable of, configured to, or operable to support a means for transmitting, in accordance with the control signaling, one or more reference signals via the set of resources. The communications manager 720 is capable of, configured to, or operable to support a means for receiving, in accordance with the control signaling, a report that indicates the set of separate inter-UE CLI metrics for the set of resources.

By including or configuring the communications manager 720 in accordance with examples as described herein, the device 705 (e.g., at least one processor controlling or otherwise coupled with the receiver 710, the transmitter 715, the communications manager 720, or a combination thereof) may support techniques for reduced processing, reduced power consumption, more efficient utilization of communication resources, reduced signaling overhead, and greater communication reliability, among other benefits.

Figure 8:
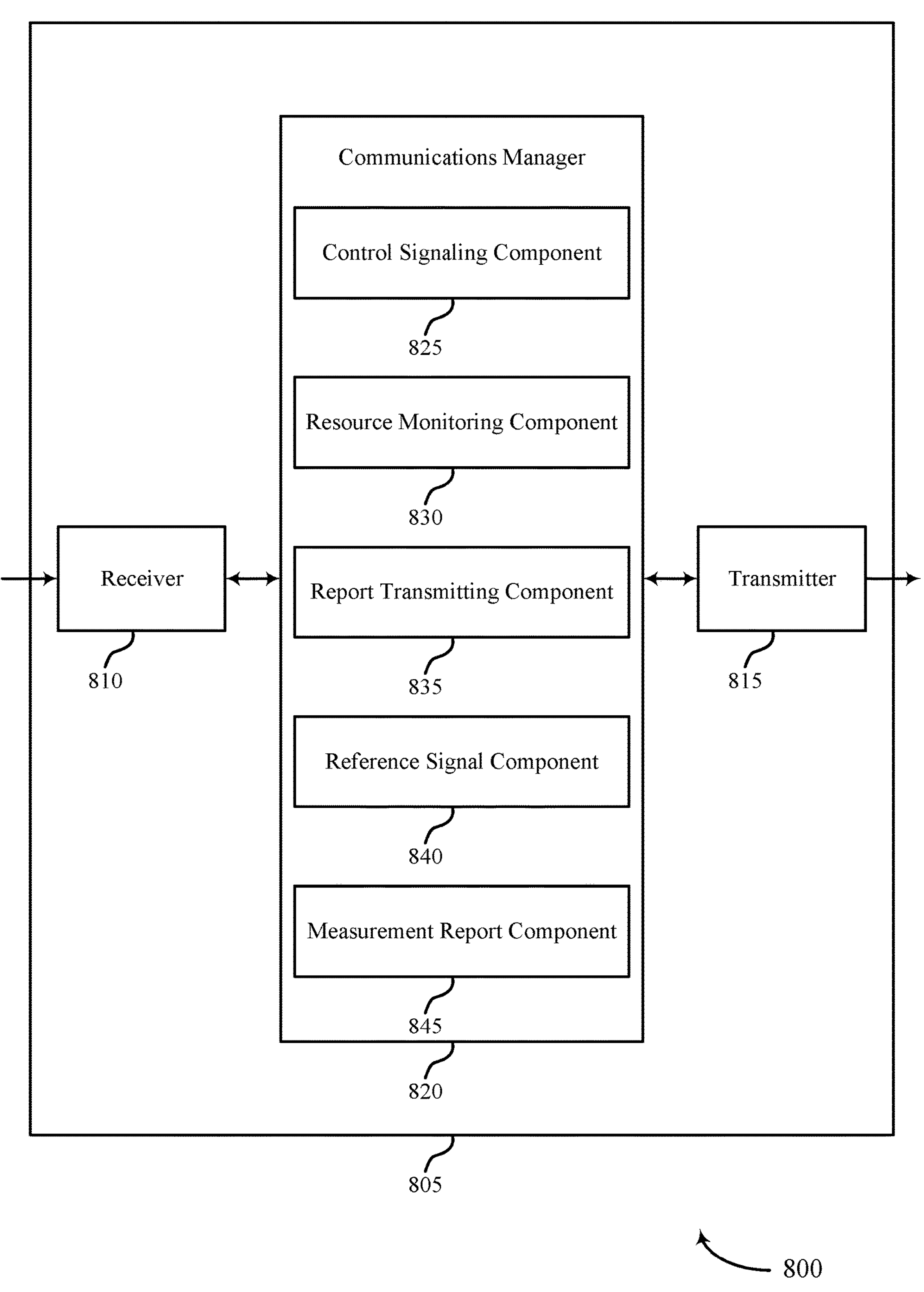

FIG. 8 shows a block diagram 800 of a device 805 that supports techniques for reporting separate CLI metrics in accordance with one or more aspects of the present disclosure. The device 805 may be an example of aspects of a device 705 or a UE 115 as described herein. The device 805 may include a receiver 810, a transmitter 815, and a communications manager 820. The device 805, or one or more components of the device 805 (e.g., the receiver 810, the transmitter 815, the communications manager 820), may include at least one processor, which may be coupled with at least one memory, to support the techniques described herein. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for reporting separate CLI metrics). Information may be passed on to other components of the device 805. The receiver 810 may utilize a single antenna or a set of antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for reporting separate CLI metrics). In some examples, the transmitter 815 may be co-located with a receiver 810 in a transceiver module. The transmitter 815 may utilize a single antenna or a set of antennas.

The device 805, or various components thereof, may be an example of means for performing various aspects of techniques for reporting separate CLI metrics as described herein. For example, the communications manager 820 may include a control signaling component 825, a resource monitoring component 830, a report transmitting component 835, a reference signal component 840, a measurement report component 845, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE (such as the device 805) in accordance with examples disclosed herein. The control signaling component 825 is capable of, configured to, or operable to support a means for receiving control signaling that indicates a set of resources to monitor for inter-UE CLI and a set of separate inter-UE CLI metrics for the UE to report for the set of resources. The resource monitoring component 830 is capable of, configured to, or operable to support a means for monitoring, in accordance with the control signaling, the set of resources to determine the set of separate inter-UE CLI metrics for the set of resources. The report transmitting component 835 is capable of, configured to, or operable to support a means for transmitting, in accordance with the control signaling, a report that indicates the set of separate inter-UE CLI metrics for the set of resources.

Additionally, or alternatively, the communications manager 820 may support wireless communications at a UE (such as the device 805) in accordance with examples disclosed herein. The control signaling component 825 is capable of, configured to, or operable to support a means for transmitting or receiving control signaling that indicates a set of resources to monitor for inter-UE CLI and a set of separate inter-UE CLI metrics to report for the set of resources. The reference signal component 840 is capable of, configured to, or operable to support a means for transmitting, in accordance with the control signaling, one or more reference signals via the set of resources. The measurement report component 845 is capable of, configured to, or operable to support a means for receiving, in accordance with the control signaling, a report that indicates the set of separate inter-UE CLI metrics for the set of resources.

In some cases, the control signaling component 825, the resource monitoring component 830, the report transmitting component 835, the reference signal component 840, and the measurement report component 845 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling component 825, the resource monitoring component 830, the report transmitting component 835, the reference signal component 840, and the measurement report component 845 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
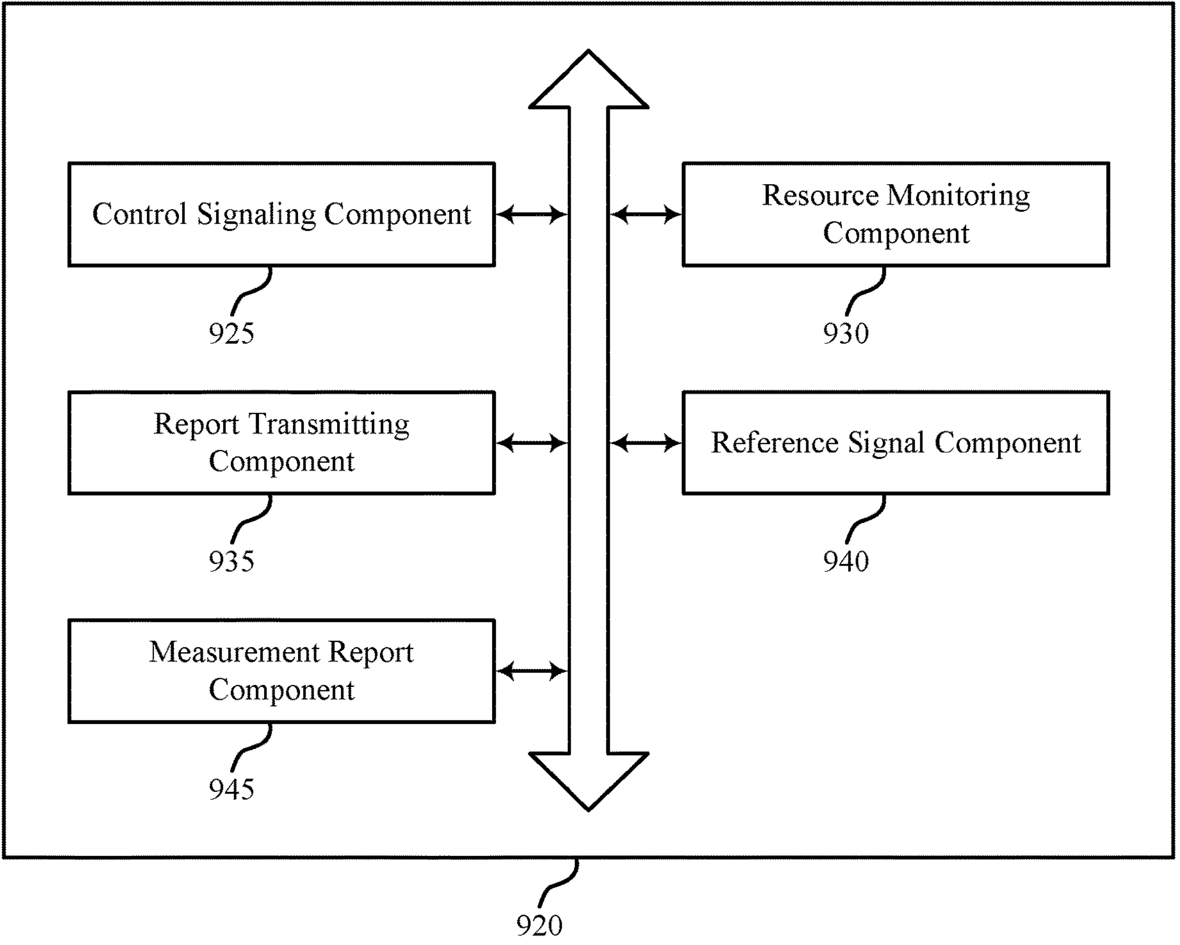
FIG. 9 shows a block diagram of a communications manager that supports techniques for reporting separate CLI metrics in accordance with one or more aspects of the present disclosure.

FIG. 9 shows a block diagram 900 of a communications manager 920 that supports techniques for reporting separate CLI metrics in accordance with one or more aspects of the present disclosure. The communications manager 920 may be an example of aspects of a communications manager 720, a communications manager 820, or both, as described herein. The communications manager 920, or various components thereof, may be an example of means for performing various aspects of techniques for reporting separate CLI metrics as described herein. For example, the communications manager 920 may include a control signaling component 925, a resource monitoring component 930, a report transmitting component 935, a reference signal component 940, a measurement report component 945, or any combination thereof. Each of these components, or sub-components thereof (e.g., at least one processor, at least one memory) may communicate, directly or indirectly, with one another (e.g., via one or more buses).

The communications manager 920 may support wireless communications at a UE (such as the UE 115-*b* described with reference to FIG. 2) in accordance with examples disclosed herein. The control signaling component 925 is capable of, configured to, or operable to support a means for receiving control signaling that indicates a set of resources to monitor for inter-UE CLI and a set of separate inter-UE CLI metrics for the UE to report for the set of resources. The resource monitoring component 930 is capable of, configured to, or operable to support a means for monitoring, in accordance with the control signaling, the set of resources to determine the set of separate inter-UE CLI metrics for the set of resources. The report transmitting component 935 is capable of, configured to, or operable to support a means for transmitting, in accordance with the control signaling, a report that indicates the set of separate inter-UE CLI metrics for the set of resources.

In some examples, to support receiving the control signaling, the control signaling component 925 is capable of, configured to, or operable to support a means for receiving, via the control signaling, an indication of a CSI report configuration identifying the set of separate inter-UE CLI metrics for the UE to report, the set of separate inter-UE CLI metrics including at least a CLI RSRP, or a CLI RSSI, or a CLI SINR, or a combination thereof.

In some examples, to support receiving the control signaling, the control signaling component 925 is capable of, configured to, or operable to support a means for receiving, via the control signaling, an indication of a CSI resource configuration identifying the set of resources to monitor for inter-UE CLI, the set of resources including one of an SRS resource or resource set or an RSSI resource or resource set.

In some examples, to support receiving the control signaling, the control signaling component 925 is capable of, configured to, or operable to support a means for receiving, via the control signaling, an indication of a CLI resource configuration identifying the set of resources to monitor for inter-UE CLI, the set of resources including an SRS resource set, an RSSI resources set, or both.

In some examples, to support receiving the control signaling, the control signaling component 925 is capable of, configured to, or operable to support a means for receiving, via the control signaling, an indication of a CSI resource configuration identifying a CSI IMR set list that includes at least a subset of the set of resources to monitor for inter-UE CLI, the subset including one or more dedicated CMRs or IMRs. In some examples, the set of resources include a CSI IMR that is used for CLI RSSI measurement.

In some examples, to support receiving the control signaling, the control signaling component 925 is capable of, configured to, or operable to support a means for receiving, via the control signaling, an indication of a CSI resource configuration identifying a CSI-RS resource set list and a CLI resource set list that indicate the set of resources to monitor for channel and CLI, the set of resources including at least an NZP CSI-RS resource set, or an SRS resource set, or an RSSI resource set, or a combination thereof.

In some examples, to support receiving the control signaling, the control signaling component 925 is capable of, configured to, or operable to support a means for receiving, via the control signaling, an indication of a CSI resource configuration identifying the set of separate inter-UE CLI metrics, a CLI resource set, an NZP CSI-RS resource set, and a linkage between at least one CMR of the NZP CSI-RS resource set and one or more IMRs of the CLI resource set, where the set of separate inter-UE CLI metrics include at least a CLI SINR.

In some examples, to support receiving the control signaling, the control signaling component 925 is capable of, configured to, or operable to support a means for receiving, via the control signaling, an indication of a CSI report configuration identifying the set of resources to monitor for inter-UE CLI, the set of resources including at least one dedicated CLI measurement resource associated with a CSI resource configuration of the UE.

In some examples, to support receiving the control signaling, the control signaling component 925 is capable of, configured to, or operable to support a means for receiving, via the control signaling, an indication of a CSI report configuration identifying the set of resources to monitor for inter-UE CLI, the set of resources including an SRS resource set, an RSSI resource set, or both.

In some examples, to support receiving the control signaling, the control signaling component 925 is capable of, configured to, or operable to support a means for receiving, via the control signaling, an indication of a CLI report configuration identifying the set of resources to monitor for inter-UE CLI, the set of resources including an SRS resource set, an RSSI resource set, or both.

In some examples, to support receiving the control signaling, the control signaling component 925 is capable of, configured to, or operable to support a means for receiving, via the control signaling, an indication of a CSI report configuration including a report quantity field that indicates the set of separate inter-UE CLI metrics including at least one of a CLI RSRP, a CLI RSSI, or a CLI SINR.

In some examples, to support receiving the control signaling, the control signaling component 925 is capable of, configured to, or operable to support a means for receiving, via the control signaling, an indication of an aperiodic CSI report trigger state configuration identifying the set of resources to monitor for inter-UE CLI, the set of resources including an SRS resources set, an RSSI resource set, or both.

In some examples, the aperiodic CSI report trigger state configuration further indicates QCL type-D information to use for CLI reference signal reception and receive beam measurement at the UE.

In some examples, to support receiving the control signaling, the control signaling component 925 is capable of, configured to, or operable to support a means for receiving, via the control signaling, an indication of an aperiodic CLI report trigger state configuration identifying the set of resources to monitor for inter-UE CLI, the set of resources including an SRS resources set, an RSSI resource set, or both.

In some examples, the aperiodic CLI report trigger state configuration further indicates QCL type-D information to use for CLI reference signal reception and receive beam measurement at the UE.

Additionally, or alternatively, the communications manager 920 may support wireless communications at a UE (such as the UE 115-*a* described with reference to FIG. 2) in accordance with examples disclosed herein. In some examples, the control signaling component 925 is capable of, configured to, or operable to support a means for transmitting or receiving control signaling that indicates a set of resources to monitor for inter-UE CLI and a set of separate inter-UE CLI metrics to report for the set of resources. The reference signal component 940 is capable of, configured to, or operable to support a means for transmitting, in accordance with the control signaling, one or more reference signals via the set of resources. The measurement report component 945 is capable of, configured to, or operable to support a means for receiving, in accordance with the control signaling, a report that indicates the set of separate inter-UE CLI metrics for the set of resources.

In some examples, to support transmitting or receiving the control signaling, the control signaling component 925 is capable of, configured to, or operable to support a means for transmitting or receiving, via the control signaling, an indication of a CSI report configuration identifying the set of separate inter-UE CLI metrics that include at least a CLI RSRP, or a CLI RSSI, or a CLI SINR, or a combination thereof.

In some examples, to support transmitting or receiving the control signaling, the control signaling component 925 is capable of, configured to, or operable to support a means for transmitting or receiving, via the control signaling, an indication of a CSI resource configuration identifying the set of resources to monitor for inter-UE CLI, the set of resources including one of an SRS resource or resource set or an RSSI resource or resource set.

In some examples, to support transmitting or receiving the control signaling, the control signaling component 925 is capable of, configured to, or operable to support a means for transmitting or receiving, via the control signaling, an indication of a CLI resource configuration identifying the set of resources to monitor for inter-UE CLI, the set of resources including an SRS resource set, an RSSI resources set, or both.

In some examples, to support transmitting or receiving the control signaling, the control signaling component 925 is capable of, configured to, or operable to support a means for transmitting or receiving, via the control signaling, an indication of a CSI resource configuration identifying a CSI IMR set list that includes at least a subset of the set of resources to monitor for inter-UE CLI, the subset including one or more dedicated CMRs or IMRs. In some examples, the set of resources include a CSI IMR that is used for CLI RSSI measurement.

In some examples, to support transmitting or receiving the control signaling, the control signaling component 925 is capable of, configured to, or operable to support a means for transmitting or receiving, via the control signaling, an indication of a CSI resource configuration identifying the set of separate inter-UE CLI metrics, a CLI resource set, an NZP CSI-RS resource set, and a linkage between at least one CMR of the NZP CSI-RS resource set and one or more IMRs of the CLI resource set, where the set of separate inter-UE CLI metrics include at least a CLI SINR.

In some examples, to support transmitting or receiving the control signaling, the control signaling component 925 is capable of, configured to, or operable to support a means for transmitting or receiving, via the control signaling, an indication of a CSI report configuration identifying the set of resources to monitor for channel or CLI, the set of resources including an SRS resource set, an RSSI resource set, or both.

In some examples, to support transmitting or receiving the control signaling, the control signaling component 925 is capable of, configured to, or operable to support a means for transmitting or receiving, via the control signaling, an indication of a CLI report configuration identifying the set of resources to monitor for inter-UE CLI, the set of resources including an SRS resource set, an RSSI resource set, or both.

In some examples, to support transmitting or receiving the control signaling, the control signaling component 925 is capable of, configured to, or operable to support a means for transmitting or receiving, via the control signaling, an indication of a CSI report configuration including a report quantity field that indicates the set of separate inter-UE CLI metrics including at least one of a CLI RSRP, or a CLI RSSI, or a CLI SINR, or a combination thereof.

In some examples, to support transmitting or receiving the control signaling, the control signaling component 925 is capable of, configured to, or operable to support a means for transmitting or receiving, via the control signaling, an indication of an aperiodic CSI report trigger state configuration identifying the set of resources to monitor for inter-UE CLI, the set of resources including at least an SRS resources set, or an RSSI resource set, or both.

In some examples, the aperiodic CSI report trigger state configuration further indicates QCL type-D information to use for CLI reference signal reception and receive beam measurement.

In some examples, to support transmitting or receiving the control signaling, the control signaling component 925 is capable of, configured to, or operable to support a means for transmitting or receiving, via the control signaling, an indication of an aperiodic CLI report trigger state configuration identifying the set of resources to monitor for inter-UE CLI, the set of resources including an SRS resources set, an RSSI resource set, or both.

In some cases, the control signaling component 925, the resource monitoring component 930, the report transmitting component 935, the reference signal component 940, and the measurement report component 945 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling component 925, the resource monitoring component 930, the report transmitting component 935, the reference signal component 940, and the measurement report component 945 discussed herein.

Figure 10:
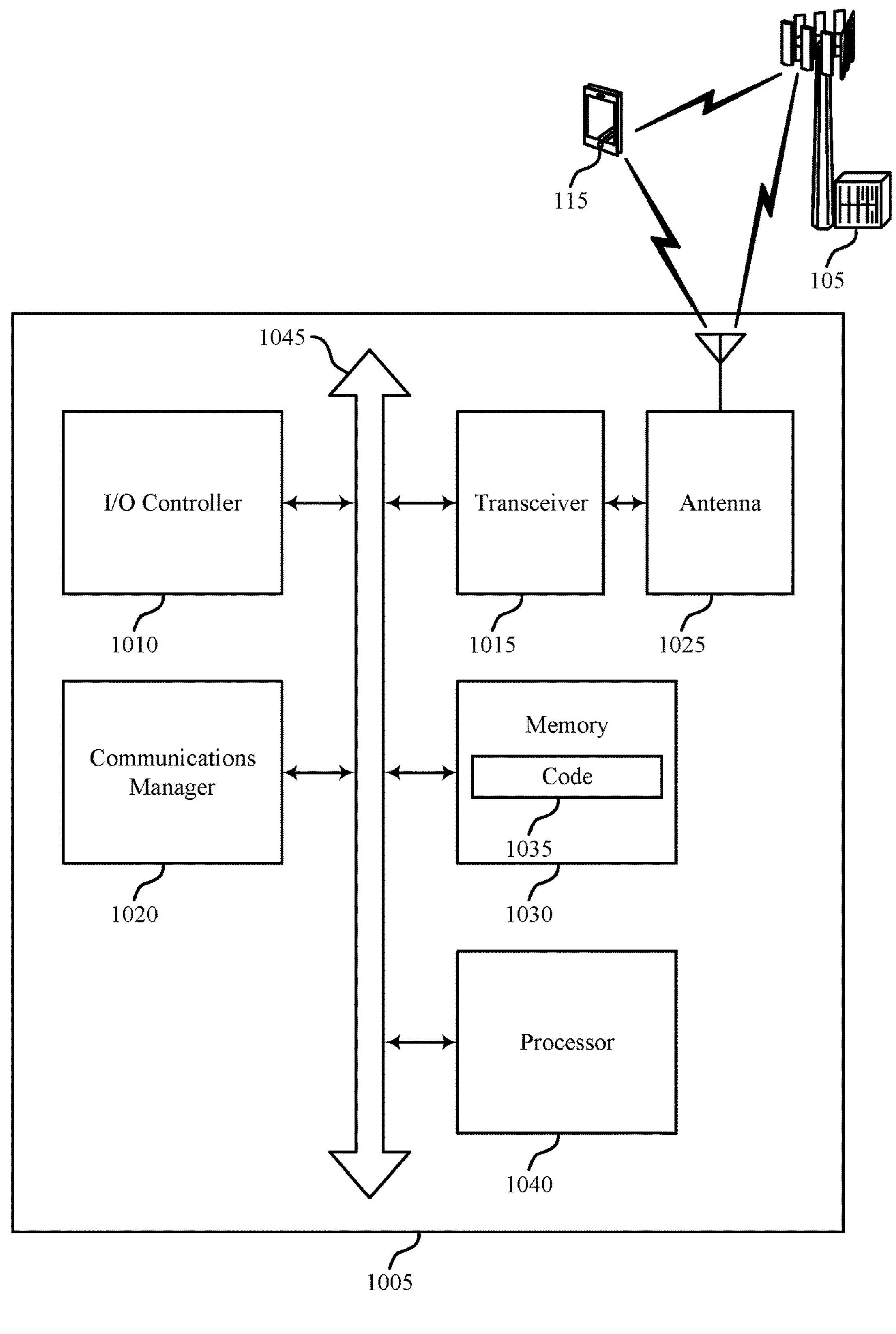
FIG. 10 shows a diagram of a system including a device that supports techniques for reporting separate CLI metrics in accordance with one or more aspects of the present disclosure.

FIG. 10 shows a diagram of a system 1000 including a device 1005 that supports techniques for reporting separate CLI metrics in accordance with one or more aspects of the present disclosure. The device 1005 may be an example of or include the components of a device 705, a device 805, or a UE 115 as described herein. The device 1005 may communicate (e.g., wirelessly) with one or more network nodes 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, at least one memory 1030, code 1035, and at least one processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of at least one processor, such as the at least one processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The at least one memory 1030 may include random access memory (RAM) and read-only memory (ROM). The at least one memory 1030 may store computer-readable, computer-executable code 1035 including instructions that, when executed by the at least one processor 1040, cause the device 1005 to perform various functions described herein. The code 1035 may be stored in a non-transitory computer-readable medium such as system memory or another type of memory. In some cases, the code 1035 may not be directly executable by the at least one processor 1040 but may cause a computer (e.g., when compiled and executed) to perform functions described herein. In some cases, the at least one memory 1030 may contain, among other things, a basic I/O system (BIOS) which may control basic hardware or software operation such as the interaction with peripheral components or devices.

The at least one processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1040 may be configured to operate a memory array using a memory controller. In some other cases, a memory controller may be integrated into the at least one processor 1040. The at least one processor 1040 may be configured to execute computer-readable instructions stored in at least one memory (e.g., the at least one memory 1030) to cause the device 1005 to perform various functions (e.g., functions or tasks supporting techniques for reporting separate CLI metrics). For example, the device 1005 or a component of the device 1005 may include at least one processor 1040 and at least one memory 1030 coupled with or to the at least one processor 1040, the at least one processor 1040 and at least one memory 1030 configured to perform various functions described herein. In some examples, the at least one processor 1040 may include multiple processors, and the at least one memory 1030 may include multiple memories. One or more of the multiple processors may be coupled with one or more of the multiple memories, which may, individually or collectively, be configured to perform various functions herein.

The communications manager 1020 may support wireless communications at a UE (such as the device 1005) in accordance with examples disclosed herein. For example, the communications manager 1020 is capable of, configured to, or operable to support a means for receiving control signaling that indicates a set of resources to monitor for inter-UE CLI and a set of separate inter-UE CLI metrics for the UE to report for the set of resources. The communications manager 1020 is capable of, configured to, or operable to support a means for monitoring, in accordance with the control signaling, the set of resources to determine the set of separate inter-UE CLI metrics for the set of resources. The communications manager 1020 is capable of, configured to, or operable to support a means for transmitting, in accordance with the control signaling, a report that indicates the set of separate inter-UE CLI metrics for the set of resources.

Additionally, or alternatively, the communications manager 1020 may support wireless communications at a UE (such as the device 1005) in accordance with examples disclosed herein. For example, the communications manager 1020 is capable of, configured to, or operable to support a means for transmitting or receiving control signaling that indicates a set of resources to monitor for inter-UE CLI and a set of separate inter-UE CLI metrics to report for the set of resources. The communications manager 1020 is capable of, configured to, or operable to support a means for transmitting, in accordance with the control signaling, one or more reference signals via the set of resources. The communications manager 1020 is capable of, configured to, or operable to support a means for receiving, in accordance with the control signaling, a report that indicates the set of separate inter-UE CLI metrics for the set of resources.

By including or configuring the communications manager 1020 in accordance with examples as described herein, the device 1005 may support techniques for improved communication reliability, reduced latency, reduced CLI, higher throughput, and reduced signaling overhead, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the at least one processor 1040, the at least one memory 1030, the code 1035, or any combination thereof. For example, the code 1035 may include instructions executable by the processor 1040 to cause the device 1005 to perform various aspects of techniques for reporting separate CLI metrics as described herein, or the at least one processor 1040 and the at least one memory 1030 may be otherwise configured to perform or support such operations.

Figure 11:
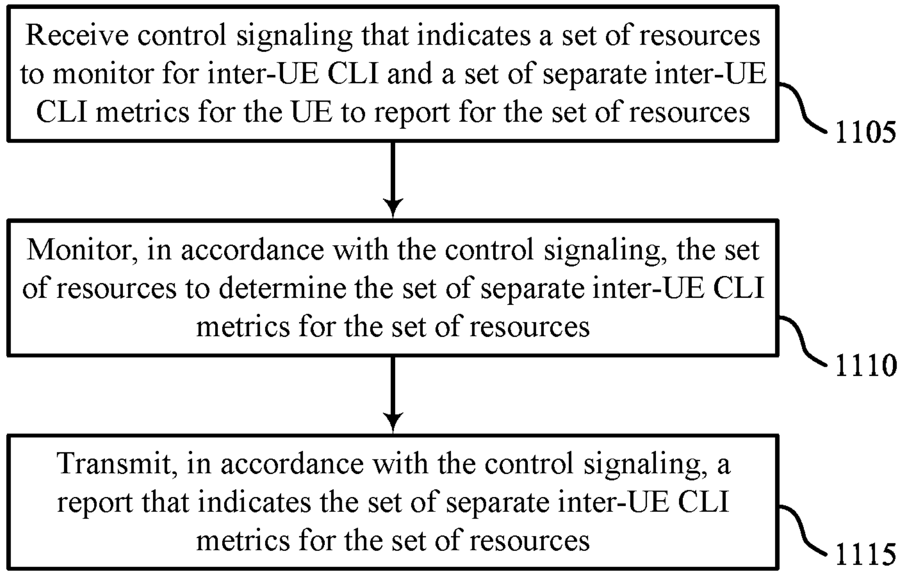
FIGS. 11 and 12 show flowcharts illustrating methods that support techniques for reporting separate CLI metrics in accordance with one or more aspects of the present disclosure.

FIG. 11 shows a flowchart illustrating a method 1100 that supports techniques for reporting separate CLI metrics in accordance with aspects of the present disclosure. The operations of the method 1100 may be implemented by a UE or components thereof. For example, the operations of the method 1100 may be performed by a UE 115, as described with reference to FIGS. 1 through 10. In some examples, the UE may execute a set of instructions to control the functional elements of the UE to perform the described functions. Additionally, or alternatively, the UE may perform aspects of the described functions using special-purpose hardware.

At 1105, the UE may receive control signaling that indicates a set of resources to monitor for inter-UE CLI and a set of separate inter-UE CLI metrics for the UE to report for the set of resources. The operations of 1105 may be performed in accordance with examples disclosed herein. In some examples, aspects of the operations of 1105 may be performed by a control signaling component 925, as described with reference to FIG. 9.

At 1110, the UE may monitor, in accordance with the control signaling, the set of resources to determine the set of separate inter-UE CLI metrics for the set of resources. The operations of 1110 may be performed in accordance with examples disclosed herein. In some examples, aspects of the operations of 1110 may be performed by a resource monitoring component 930, as described with reference to FIG. 9.

At 1115, the UE may transmit, in accordance with the control signaling, a report that indicates the set of separate inter-UE CLI metrics for the set of resources. The operations of 1115 may be performed in accordance with examples disclosed herein. In some examples, aspects of the operations of 1115 may be performed by a report transmitting component 935, as described with reference to FIG. 9.

Figure 12:
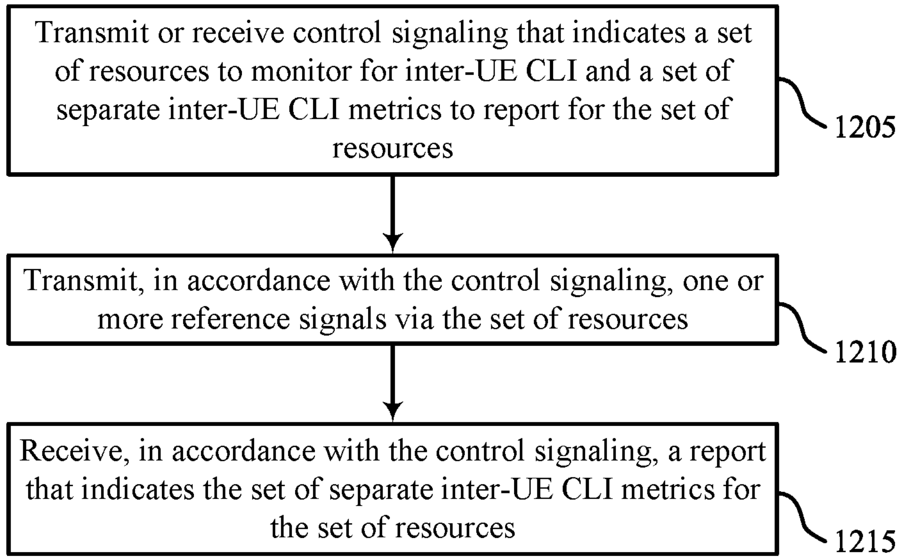

FIG. 12 shows a flowchart illustrating a method 1200 that supports techniques for reporting separate CLI metrics in accordance with aspects of the present disclosure. The operations of the method 1200 may be implemented by a UE or components thereof. For example, the operations of the method 1200 may be performed by a UE 115, as described with reference to FIGS. 1 through 10. In some examples, the UE may execute a set of instructions to control the functional elements of the UE to perform the described functions. Additionally, or alternatively, the UE may perform aspects of the described functions using special-purpose hardware.

At 1205, the UE may transmit or receive control signaling that indicates a set of resources to monitor for inter-UE CLI and a set of separate inter-UE CLI metrics to report for the set of resources. The operations of 1205 may be performed in accordance with examples disclosed herein. In some examples, aspects of the operations of 1205 may be performed by a control signaling component 925, as described with reference to FIG. 9.

At 1210 the UE may transmit, in accordance with the control signaling, one or more reference signals via the set of resources. The operations of 1210 may be performed in accordance with examples disclosed herein. In some examples, aspects of the operations of 1210 may be performed by a reference signal component 940, as described with reference to FIG. 9.

At 1215, the UE may receive, in accordance with the control signaling, a report that indicates the set of separate inter-UE CLI metrics for the set of resources. The operations of 1215 may be performed in accordance with examples disclosed herein. In some examples, aspects of the operations of 1215 may be performed by a measurement report component 945, as described with reference to FIG. 9.

The following provides an overview of aspects of the present disclosure:

Aspect 1: A method for wireless communications at a UE, comprising: receiving control signaling that indicates a plurality of resources to monitor for inter-UE cross-link interference and a plurality of separate inter-UE cross-link interference metrics for the UE to report for the plurality of resources; monitoring, in accordance with the control signaling, the plurality of resources to determine the plurality of separate inter-UE cross-link interference metrics for the plurality of resources; and transmitting, in accordance with the control signaling, a report that indicates the plurality of separate inter-UE cross-link interference metrics for the plurality of resources.

Aspect 2: The method of aspect 1, wherein receiving the control signaling comprises: receiving, via the control signaling, an indication of a channel state information report configuration identifying the plurality of separate inter-UE cross-link interference metrics for the UE to report, the plurality of separate inter-UE cross-link interference metrics comprising at least a cross-link interference reference signal received power, or a cross-link interference received signal strength indicator, or a cross-link interference signal to interference and noise ratio, or a combination thereof.

Aspect 3: The method of any of aspects 1 through 2, wherein receiving the control signaling comprises: receiving, via the control signaling, an indication of a channel state information resource configuration identifying the plurality of resources to monitor for inter-UE cross-link interference, the plurality of resources comprising one of a sounding reference signal resource or resource set or a received signal strength indicator resource or resource set.

Aspect 4: The method of any of aspects 1 through 3, wherein receiving the control signaling comprises: receiving, via the control signaling, an indication of a cross-link interference resource configuration identifying the plurality of resources to monitor for inter-UE cross-link interference, the plurality of resources comprising a sounding reference signal resource set, a received signal strength indicator resources set, or both.

Aspect 5: The method of any of aspects 1 through 4, wherein receiving the control signaling comprises: receiving, via the control signaling, an indication of a channel state information resource configuration identifying a channel state information interference measurement resource set list that includes at least a subset of the plurality of resources to monitor for inter-UE cross-link interference, the subset comprising one or more dedicated channel measurement resources or interference measurement resources.

Aspect 6: The method of any of aspects 1 through 5, wherein the plurality of resources comprise a channel state information interference measurement resource that is used for cross-link interference received signal strength indicator measurement.

Aspect 7: The method of any of aspects 1 through 6, wherein receiving the control signaling comprises: receiving, via the control signaling, an indication of a channel state information resource configuration identifying a channel state information reference signal resource set list and a cross-link interference resource set list that indicate the plurality of resources to monitor for channel and cross-link interference, the plurality of resources comprising at least a non-zero-power channel state information reference signal resource set, or a sounding reference signal resource set, or a received signal strength indicator resource set, or a combination thereof.

Aspect 8: The method of any of aspects 1 through 7, wherein receiving the control signaling comprises: receiving, via the control signaling, an indication of a channel state information resource configuration identifying the plurality of separate inter-UE cross-link interference metrics, a cross-link interference resource set, a non-zero power channel state information reference signal resource set, and a linkage between at least one channel measurement resource of the non-zero power channel state information reference signal resource set and one or more interference measurement resources of the cross-link interference resource set, wherein the plurality of separate inter-UE cross-link interference metrics comprise at least a cross-link interference signal to interference and noise ratio.

Aspect 9: The method of any of aspects 1 through 8, wherein receiving the control signaling comprises: receiving, via the control signaling, an indication of a channel state information report configuration identifying the plurality of resources to monitor for inter-UE cross-link interference, the plurality of resources comprising at least one dedicated cross-link interference measurement resource associated with a channel state information resource configuration of the UE.

Aspect 10: The method of any of aspects 1 through 9, wherein receiving the control signaling comprises: receiving, via the control signaling, an indication of a channel state information report configuration identifying the plurality of resources to monitor for inter-UE cross-link interference, the plurality of resources comprising a sounding reference signal resource set, a received signal strength indicator resource set, or both.

Aspect 11: The method of any of aspects 1 through 10, wherein receiving the control signaling comprises: receiving, via the control signaling, an indication of a cross-link interference report configuration identifying the plurality of resources to monitor for inter-UE cross-link interference, the plurality of resources comprising a sounding reference signal resource set, a received signal strength indicator resource set, or both.

Aspect 12: The method of any of aspects 1 through 11, wherein receiving the control signaling comprises: receiving, via the control signaling, an indication of a channel state information report configuration comprising a report quantity field that indicates the plurality of separate inter-UE cross-link interference metrics including at least one of a cross-link interference reference signal received power, a cross-link interference received signal strength indicator, or a cross-link interference signal to interference and noise ratio.

Aspect 13: The method of any of aspects 1 through 12, wherein receiving the control signaling comprises: receiving, via the control signaling, an indication of an aperiodic channel state information report trigger state configuration identifying the plurality of resources to monitor for inter-UE cross-link interference, the plurality of resources comprising a sounding reference signal resources set, a received signal strength indicator resource set, or both.

Aspect 14: The method of aspect 13, wherein the aperiodic channel state information report trigger state configuration further indicates quasi-co-location type D information to use for cross-link interference reference signal reception and receive beam measurement at the UE.

Aspect 15: The method of any of aspects 1 through 14, wherein receiving the control signaling comprises: receiving, via the control signaling, an indication of an aperiodic cross-link interference report trigger state configuration identifying the plurality of resources to monitor for inter-UE cross-link interference, the plurality of resources comprising a sounding reference signal resources set, a received signal strength indicator resource set, or both.

Aspect 16: The method of aspect 15, wherein the aperiodic cross-link interference report trigger state configuration further indicates quasi-co-location type D information to use for cross-link interference reference signal reception and receive beam measurement at the UE.

Aspect 17: A method for wireless communications at a UE, comprising: transmitting or receiving control signaling that indicates a plurality of resources to monitor for inter-UE cross-link interference and a plurality of separate inter-UE cross-link interference metrics to report for the plurality of resources; transmitting, in accordance with the control signaling, one or more reference signals via the plurality of resources; and receiving, in accordance with the control signaling, a report that indicates the plurality of separate inter-UE cross-link interference metrics for the plurality of resources.

Aspect 18: The method of aspect 17, wherein transmitting or receiving the control signaling comprises: transmitting or receiving, via the control signaling, an indication of a channel state information report configuration identifying the plurality of separate inter-UE cross-link interference metrics that comprise at least a cross-link interference reference signal received power, or a cross-link interference received signal strength indicator, or a cross-link interference signal to interference and noise ratio, or a combination thereof.

Aspect 19: The method of any of aspects 17 through 18, wherein transmitting or receiving the control signaling comprises: transmitting or receiving, via the control signaling, an indication of a channel state information resource configuration identifying the plurality of resources to monitor for inter-UE cross-link interference, the plurality of resources comprising one of a sounding reference signal resource or resource set or a received signal strength indicator resource or resource set.

Aspect 20: The method of any of aspects 17 through 19, wherein transmitting or receiving the control signaling comprises: transmitting or receiving, via the control signaling, an indication of a cross-link interference resource configuration identifying the plurality of resources to monitor for inter-UE cross-link interference, the plurality of resources comprising a sounding reference signal resource set, a received signal strength indicator resources set, or both.

Aspect 21: The method of any of aspects 17 through 20, wherein transmitting or receiving the control signaling comprises: transmitting or receiving, via the control signaling, an indication of a channel state information resource configuration identifying a channel state information interference measurement resource set list that includes at least a subset of the plurality of resources to monitor for inter-UE cross-link interference, the subset comprising one or more dedicated channel measurement resources or interference measurement resources.

Aspect 22: The method of any of aspects 17 through 21, wherein the plurality of resources comprise a channel state information interference measurement resource that is used for cross-link interference received signal strength indicator measurement.

Aspect 23: The method of any of aspects 17 through 22, wherein transmitting or receiving the control signaling comprises: transmitting or receiving, via the control signaling, an indication of a channel state information resource configuration identifying the plurality of separate inter-UE cross-link interference metrics, a cross-link interference resource set, a non-zero power channel state information reference signal resource set, and a linkage between at least one channel measurement resource of the non-zero power channel state information reference signal resource set and one or more interference measurement resources of the cross-link interference resource set, wherein the plurality of separate inter-UE cross-link interference metrics comprise at least a cross-link interference signal to interference and noise ratio.

Aspect 24: The method of any of aspects 17 through 23, wherein transmitting or receiving the control signaling comprises: transmitting or receiving, via the control signaling, an indication of a channel state information report configuration identifying the plurality of resources to monitor for channel or cross-link interference, the plurality of resources comprising a sounding reference signal resource set, a received signal strength indicator resource set, or both.

Aspect 25: The method of any of aspects 17 through 24, wherein transmitting or receiving the control signaling comprises: transmitting or receiving, via the control signaling, an indication of a cross-link interference report configuration identifying the plurality of resources to monitor for inter-UE cross-link interference, the plurality of resources comprising a sounding reference signal resource set, a received signal strength indicator resource set, or both.

Aspect 26: The method of any of aspects 17 through 25, wherein transmitting or receiving the control signaling comprises: transmitting or receiving, via the control signaling, an indication of a channel state information report configuration comprising a report quantity field that indicates the plurality of separate inter-UE cross-link interference metrics including at least one of a cross-link interference reference signal received power, a cross-link interference received signal strength indicator, or a cross-link interference signal to interference and noise ratio.

Aspect 27: The method of any of aspects 17 through 26, wherein transmitting or receiving the control signaling comprises: transmitting or receiving, via the control signaling, an indication of an aperiodic channel state information report trigger state configuration identifying the plurality of resources to monitor for inter-UE cross-link interference, the plurality of resources comprising a sounding reference signal resources set, a received signal strength indicator resource set, or both.

Aspect 28: The method of aspect 27, wherein the aperiodic channel state information report trigger state configuration further indicates quasi-co-location type D information to use for cross-link interference reference signal reception and receive beam measurement.

Aspect 29: The method of any of aspects 17 through 28, wherein transmitting or receiving the control signaling comprises: transmitting or receiving, via the control signaling, an indication of an aperiodic cross-link interference report trigger state configuration identifying the plurality of resources to monitor for inter-UE cross-link interference, the plurality of resources comprising a sounding reference signal resources set, a received signal strength indicator resource set, or both.

Aspect 30: An apparatus for wireless communications at a UE, comprising at least one memory and at least one processor coupled to the at least one memory, the at least one processor configured to perform a method of any of aspects 1 through 16.

Aspect 31: An apparatus for wireless communications at a UE, comprising at least one means for performing a method of any of aspects 1 through 16.

Aspect 32: A non-transitory computer-readable medium storing code for wireless communications at a UE, the code comprising instructions executable by a processor to perform a method of any of aspects 1 through 16.

Aspect 33: An apparatus for wireless communications at a UE, comprising at least one memory and at least one processor coupled to the at least one memory, the at least one processor configured to perform a method of any of aspects 17 through 29.

Aspect 34: An apparatus for wireless communications at a UE, comprising at least one means for performing a method of any of aspects 17 through 29.

Aspect 35: A non-transitory computer-readable medium storing code for wireless communications at a UE, the code comprising instructions executable by a processor to perform a method of any of aspects 17 through 29.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Any functions or operations described herein as being capable of being performed by a processor may be performed by multiple processors that, individually or collectively, are capable of performing the described functions or operations. For example, the functions described herein may be performed by multiple processors, each tasked with at least a subset of the described functions, such that, collectively, the multiple processors perform all of the described functions. As such, the described functions can be performed by a single processor or a group of processors functioning together (i.e., collectively) to perform the described functions, where any one processor performs at least a subset of the described functions.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

Any functions or operations described herein as being capable of being performed by a memory may be performed by multiple memories that, individually or collectively, are capable of performing the described functions or operations. For example, the functions described herein may be performed by multiple memories, each tasked with at least a subset of the described functions, such that, collectively, the multiple memories perform all of the described functions. As such, the described functions can be performed by a single memory or a group of memories functioning together (i.e., collectively) to perform the described functions, where any one memory performs at least a subset of the described functions.

As used herein, including in the claims, "or" as used in a list of items (e.g., including a list of items prefaced by a phrase such as "at least one of" or "one or more of") indicates an inclusive list such that, for example, a list of at least one of A, B, or C means, e.g., A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

at least one memory; and at least one processor coupled to the at least one memory, the at least one processor configured to:

receive control signaling that indicates a plurality of resources to monitor for inter-UE cross-link interference and a plurality of separate inter-UE cross-link interference metrics for the UE to report for the plurality of resources, wherein the control signaling comprises an indication of a channel state information aperiodic trigger state list information element that identifies the plurality of resources to monitor for the inter-UE cross-link interference, the plurality of resources comprising one of a sounding reference signal-reference signal received power resource or resource set or a cross-link interference-received signal strength indicator resource or resource set;

monitor, in accordance with the control signaling, the plurality of resources to determine the plurality of separate inter-UE cross-link interference metrics for the plurality of resources; and transmit, in accordance with the control signaling, a report that indicates the plurality of separate inter-UE cross-link interference metrics for the plurality of resources.

2. The apparatus of claim 1, wherein, to receive the control signaling, the at least one processor is configured to:

receive, via the control signaling, a second indication of a channel state information report configuration identifying the plurality of separate inter-UE cross-link interference metrics for the UE to report, the plurality of separate inter-UE cross-link interference metrics comprising at least a cross-link interference reference signal received power, or a cross-link interference received signal strength indicator, or a cross-link interference signal to interference and noise ratio, or a combination thereof.

3. The apparatus of claim 1, wherein the control signaling comprises a channel state information resource configuration information element that identifies a channel state information interference measurement resource set list that includes at least a subset of the plurality of resources to monitor for the inter-UE cross-link interference, the subset comprising one or more dedicated channel measurement resources or interference measurement resources.

4. The apparatus of claim 1, wherein the plurality of resources comprise a channel state information interference measurement resource that is used for cross-link interference received signal strength indicator measurement.

5. The apparatus of claim 1, wherein the control signaling comprises a channel state information resource configuration information element that identifies a channel state information reference signal resource set list and a cross-link interference resource set list that indicate the plurality of resources to monitor for channel and cross-link interference, the plurality of resources comprising at least a non-zero-power channel state information reference signal resource set, or a sounding reference signal resource set, or a received signal strength indicator resource set, or a combination thereof.

6. The apparatus of claim 1, wherein the control signaling comprises a channel state information resource configuration information element that identifies the plurality of separate inter-UE cross-link interference metrics, a cross-link interference resource set, a non-zero power channel state information reference signal resource set, and a linkage between at least one channel measurement resource of the non-zero power channel state information reference signal resource set and one or more interference measurement resources of the cross-link interference resource set, wherein the plurality of separate inter-UE cross-link interference metrics comprise at least a cross-link interference signal to interference and noise ratio.

7. The apparatus of claim 1, wherein, to receive the control signaling, the at least one processor is configured to:

receive, via the control signaling, a second indication of a channel state information report configuration identifying the plurality of resources to monitor for the inter-UE cross-link interference, the plurality of resources comprising at least one dedicated cross-link interference measurement resource associated with a channel state information resource configuration of the UE.

8. The apparatus of claim 1, wherein, to receive the control signaling, the at least one processor is configured to:

receive, via the control signaling, a second indication of a channel state information report configuration identifying the plurality of resources to monitor for the inter-UE cross-link interference, the plurality of resources comprising a sounding reference signal resource set, a received signal strength indicator resource set, or both.

9. The apparatus of claim 1, wherein, to receive the control signaling, the at least one processor is configured to:

receive, via the control signaling, a second indication of a cross-link interference report configuration identifying the plurality of resources to monitor for the inter-UE cross-link interference, the plurality of resources comprising a sounding reference signal resource set, a received signal strength indicator resource set, or both.

10. The apparatus of claim 1, wherein, to receive the control signaling, the at least one processor is configured to:

receive, via the control signaling, a second indication of a channel state information report configuration comprising a report quantity field that indicates the plurality of separate inter-UE cross-link interference metrics including at least one of a cross-link interference reference signal received power, a cross-link interference received signal strength indicator, or a cross-link interference signal to interference and noise ratio.

11. The apparatus of claim 1, wherein the channel state information aperiodic trigger state list information element further indicates quasi-co-location type-D information to use for cross-link interference reference signal reception and receive beam measurement at the UE.

12. The apparatus of claim 1, wherein the control signaling indicates the plurality of resources to monitor for inter-sub-band, inter-UE cross-link interference and the plurality of separate inter-UE cross-link interference metrics for the UE to report for the plurality of resources in accordance with a sub-band full duplex communication scheme.

13. An apparatus for wireless communications at a user equipment (UE), comprising:

at least one memory; and at least one processor coupled to the at least one memory, the at least one processor configured to:

transmit or receive control signaling that indicates a plurality of resources to monitor for inter-UE cross-link interference and a plurality of separate inter-UE cross-link interference metrics to report for the plurality of resources, wherein the control signaling comprises an indication of a channel state information aperiodic trigger state list information element that identifies the plurality of resources to monitor for the inter-UE cross-link interference, the plurality of resources comprising one of a sounding reference signal-reference signal received power resource or resource set or a cross-link interference-received signal strength indicator resource or resource set;

transmit, in accordance with the control signaling, one or more reference signals via the plurality of resources; and receive, in accordance with the control signaling, a report that indicates the plurality of separate inter-UE cross-link interference metrics for the plurality of resources.

14. The apparatus of claim 13, wherein, to transmit or receive the control signaling, the at least one processor is configured to:

transmit or receive, via the control signaling, a second indication of a channel state information report configuration identifying the plurality of separate inter-UE cross-link interference metrics that comprise at least a cross-link interference reference signal received power, or a cross-link interference received signal strength indicator, or a cross-link interference signal to interference and noise ratio, or a combination thereof.

15. The apparatus of claim 13, wherein the control signaling comprises a channel state information resource configuration information element that identifies a channel state information interference measurement resource set list that includes at least a subset of the plurality of resources to monitor for the inter-UE cross-link interference, the subset comprising one or more dedicated channel measurement resources or interference measurement resources.

16. The apparatus of claim 13, wherein the plurality of resources comprise a channel state information interference measurement resource that is used for cross-link interference received signal strength indicator measurement.

17. The apparatus of claim 13, wherein the control signaling comprises a channel state information resource configuration information element that identifies the plurality of separate inter-UE cross-link interference metrics, a cross-link interference resource set, a non-zero power channel state information reference signal resource set, and a linkage between at least one channel measurement resource of the non-zero power channel state information reference signal resource set and one or more interference measurement resources of the cross-link interference resource set, wherein the plurality of separate inter-UE cross-link interference metrics comprise at least a cross-link interference signal to interference and noise ratio.

18. The apparatus of claim 13, wherein, to transmit or receive the control signaling, the at least one processor is configured to:

transmit or receive, via the control signaling, a second indication of a channel state information report configuration identifying the plurality of resources to monitor for channel or cross-link interference, the plurality of resources comprising a sounding reference signal resource set, a received signal strength indicator resource set, or both.

19. The apparatus of claim 13, wherein, to transmit or receive the control signaling, the at least one processor is configured to:

transmit or receive, via the control signaling, a second indication of a cross-link interference report configuration identifying the plurality of resources to monitor for the inter-UE cross-link interference, the plurality of resources comprising a sounding reference signal resource set, a received signal strength indicator resource set, or both.

20. The apparatus of claim 13, wherein, to transmit or receive the control signaling, the at least one processor is configured to:

transmit or receive, via the control signaling, a second indication of a channel state information report configuration comprising a report quantity field that indicates the plurality of separate inter-UE cross-link interference metrics including at least one of a cross-link interference reference signal received power, a cross-link interference received signal strength indicator, or a cross-link interference signal to interference and noise ratio.

21. The apparatus of claim 13, wherein:

the channel state information aperiodic trigger state list information element further indicates quasi-co-location type-D information to use for cross-link interference reference signal reception and receive beam measurement.

22. The apparatus of claim 13, wherein the control signaling indicates the plurality of resources to monitor for inter-sub-band, inter-UE cross-link interference and the plurality of separate inter-UE cross-link interference metrics to report for the plurality of resources in accordance with a sub-band full duplex communication scheme.

23. A method for wireless communications at a user equipment (UE), comprising:

receiving control signaling that indicates a plurality of resources to monitor for inter-UE cross-link interference and a plurality of separate inter-UE cross-link interference metrics for the UE to report for the plurality of resources, wherein the control signaling comprises an indication of a channel state information aperiodic trigger state list information element that identifies the plurality of resources to monitor for the inter-UE cross-link interference, the plurality of resources comprising one of a sounding reference signal-reference signal received power resource or resource set or a cross-link interference-received signal strength indicator resource or resource set;

monitoring, in accordance with the control signaling, the plurality of resources to determine the plurality of separate inter-UE cross-link interference metrics for the plurality of resources; and transmitting, in accordance with the control signaling, a report that indicates the plurality of separate inter-UE cross-link interference metrics for the plurality of resources.

24. The method of claim 23, wherein the control signaling indicates the plurality of resources to monitor for inter-sub-band, inter-UE cross-link interference and the plurality of separate inter-UE cross-link interference metrics for the UE to report for the plurality of resources in accordance with a sub-band full duplex communication scheme.

25. A method for wireless communications at a user equipment (UE), comprising:

transmitting or receiving control signaling that indicates a plurality of resources to monitor for inter-UE cross-link interference and a plurality of separate inter-UE cross-link interference metrics to report for the plurality of resources, wherein the control signaling comprises an indication of a channel state information aperiodic trigger state list information element that identifies the plurality of resources to monitor for the inter-UE cross-link interference, the plurality of resources comprising one of a sounding reference signal-reference signal received power resource or resource set or a cross-link interference-received signal strength indicator resource or resource set;

transmitting, in accordance with the control signaling, one or more reference signals via the plurality of resources; and receiving, in accordance with the control signaling, a report that indicates the plurality of separate inter-UE cross-link interference metrics for the plurality of resources.

26. The method of claim 25, wherein the control signaling indicates the plurality of resources to monitor for inter-sub-band, inter-UE cross-link interference and the plurality of separate inter-UE cross-link interference metrics to report for the plurality of resources in accordance with a sub-band full duplex communication scheme.

* * * * *